US012250207B2

(12) United States Patent
Cicchitto

(10) Patent No.: US 12,250,207 B2
(45) Date of Patent: *Mar. 11, 2025

(54) MOBILE DEVICE ENABLED DESKTOP TETHERED AND TETHERLESS AUTHENTICATION

(71) Applicant: Nelson A. Cicchitto, San Ramon, CA (US)

(72) Inventor: Nelson A. Cicchitto, San Ramon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/375,429

(22) Filed: Sep. 29, 2023

(65) Prior Publication Data

US 2024/0031352 A1    Jan. 25, 2024

Related U.S. Application Data

(60) Continuation of application No. 17/521,611, filed on Nov. 8, 2021, now Pat. No. 11,811,750, which is a continuation of application No. 15/970,780, filed on May 3, 2018, now Pat. No. 11,171,941, which is a continuation-in-part of application No. 15/626,997, filed on Jun. 19, 2017, now Pat. No. 9,979,715, which (Continued)

(51) Int. Cl.
*H04L 9/40* (2022.01)
*H04W 12/06* (2021.01)
*H04W 12/069* (2021.01)

(52) U.S. Cl.
CPC ........ *H04L 63/0815* (2013.01); *H04L 63/083* (2013.01); *H04W 12/068* (2021.01); *H04W 12/069* (2021.01)

(58) Field of Classification Search
CPC ............... H04L 63/0815; H04L 63/083; H04L 2463/082; H04W 12/068; H04W 12/069
See application file for complete search history.

(56) References Cited

U.S. PATENT DOCUMENTS

| 6,606,627 B1 | 8/2003 | Guthrie et al. |
| 7,058,817 B1 | 6/2006 | Ellmore |
| 7,103,666 B2 | 9/2006 | Royer et al. |

(Continued)

FOREIGN PATENT DOCUMENTS

EP    1089516 A2    4/2001

OTHER PUBLICATIONS

Grassi, Paul A, et al., "Digital Identity Guidelines", NIST Special Publication 800-63A, Jun. 2017, 1-32.

(Continued)

*Primary Examiner* — Aravind K Moorthy
(74) *Attorney, Agent, or Firm* — PERKINS COIE LLP; Michael A. Glenn

(57) ABSTRACT

A technique is provided that integrates authentication from a mobile device (e.g., using biometrics, social informational data, questions and answers, and more) to allow login to laptops and desktops while they are disconnected from the Internet using a USB cable connection, Bluetooth or local wifi or any other similar protocol and/or connected to Internet without USB. The technique provides a cloud clearinghouse that ties a person's or entity's mobile device(s) to an identity that's used to authenticate a person (could be the same person) on a laptop, desktop, or similar computer system.

19 Claims, 17 Drawing Sheets

Related U.S. Application Data is a division of application No. 15/052,747, filed on Feb. 24, 2016, now Pat. No. 9,686,273.

(60) Provisional application No. 62/501,027, filed on May 3, 2017, provisional application No. 62/120,153, filed on Feb. 24, 2015.

(56) References Cited

U.S. PATENT DOCUMENTS

| | | | |
|---|---|---|---|
| 7,240,364 B1 | 7/2007 | Branscomb et al. | |
| 7,260,724 B1 | 8/2007 | Dickinson et al. | |
| 7,346,923 B2 | 3/2008 | Atkins et al. | |
| 7,490,347 B1 | 2/2009 | Schneider et al. | |
| 7,536,389 B1 | 5/2009 | Prabhakar et al. | |
| 8,073,810 B2 | 12/2011 | Maes | |
| 8,533,773 B2 | 9/2013 | Maes | |
| 8,589,338 B2 | 11/2013 | Maes | |
| 8,779,890 B2* | 7/2014 | Mueck | H04W 8/22 |
| | | | 455/418 |
| 9,026,521 B1 | 5/2015 | Daniel | |
| 9,026,592 B1 | 5/2015 | Marra | |
| 9,060,057 B1* | 6/2015 | Danis | H04L 63/083 |
| 9,064,376 B1* | 6/2015 | Rubin | H04L 63/145 |
| 9,065,827 B1 | 6/2015 | Taylor et al. | |
| 9,130,910 B1 | 9/2015 | Logue | |
| 9,294,456 B1 | 3/2016 | Timmermans | |
| 9,301,140 B1 | 3/2016 | Costigan et al. | |
| 9,356,924 B1 | 5/2016 | Shahbazi et al. | |
| 9,357,022 B1 | 5/2016 | Chou et al. | |
| 9,363,283 B1 | 6/2016 | Herrera-yagüe et al. | |
| 9,386,009 B1 | 7/2016 | Marion et al. | |
| 9,461,991 B2* | 10/2016 | Brand | H04W 12/069 |
| 9,497,312 B1 | 11/2016 | Johansson et al. | |
| 9,628,576 B1 | 4/2017 | Agarwal et al. | |
| 9,645,789 B1 | 5/2017 | Lee et al. | |
| 9,659,062 B1 | 5/2017 | Kapoor et al. | |
| 9,686,273 B2* | 6/2017 | Cicchitto | G06F 21/32 |
| 9,722,996 B1 | 8/2017 | Kolman et al. | |
| 9,747,434 B1 | 8/2017 | Avital | |
| 9,749,305 B1 | 8/2017 | Sharifi Mehr et al. | |
| 9,801,066 B1 | 10/2017 | Hanley et al. | |
| 9,807,073 B1 | 10/2017 | Miller | |
| 9,838,379 B1* | 12/2017 | Bryan | H04W 12/0431 |
| 9,979,715 B2* | 5/2018 | Cicchitto | H04L 63/0815 |
| 10,032,037 B1 | 7/2018 | Allen | |
| 10,050,976 B2 | 8/2018 | Disraeli | |
| 10,068,082 B1 | 9/2018 | Zheng et al. | |
| 10,148,619 B1 | 12/2018 | Zolfonoon | |
| 10,255,419 B1 | 4/2019 | Kragh | |
| 10,469,487 B1 | 11/2019 | Griffin et al. | |
| 10,496,810 B2 | 12/2019 | Lewis et al. | |
| 10,530,646 B1 | 1/2020 | Hecht | |
| 10,609,022 B2* | 3/2020 | Park | H04W 12/06 |
| 10,715,528 B1 | 7/2020 | Leblang et al. | |
| 10,742,634 B1 | 8/2020 | Shahbazi et al. | |
| 10,891,372 B1 | 1/2021 | Shahbazi et al. | |
| 11,122,034 B2 | 9/2021 | Cicchitto | |
| 11,171,941 B2* | 11/2021 | Cicchitto | H04L 63/083 |
| 11,206,248 B2 | 12/2021 | Watson et al. | |
| 11,245,679 B1* | 2/2022 | Su | H04L 63/083 |
| 11,811,750 B2* | 11/2023 | Cicchitto | H04W 12/068 |
| 11,816,672 B1 | 11/2023 | Singh et al. | |
| 2002/0087894 A1 | 7/2002 | Foley et al. | |
| 2002/0112183 A1 | 8/2002 | Baird et al. | |
| 2003/0163738 A1 | 8/2003 | Couillard et al. | |
| 2003/0182212 A1 | 9/2003 | Moscone et al. | |
| 2003/0182548 A1 | 9/2003 | Xiong et al. | |
| 2004/0168059 A1 | 8/2004 | Patrick | |
| 2004/0181670 A1 | 9/2004 | Thune et al. | |
| 2005/0066199 A1* | 3/2005 | Lin | H04L 63/0876 |
| | | | 726/4 |
| 2005/0071685 A1* | 3/2005 | Ho | H04W 12/082 |
| | | | 726/19 |
| 2005/0075135 A1* | 4/2005 | Cromer | G06F 21/85 |
| | | | 455/556.1 |
| 2005/0149520 A1 | 7/2005 | De | |
| 2005/0204405 A1 | 9/2005 | Wormington et al. | |
| 2005/0235044 A1 | 10/2005 | Tazuma | |
| 2005/0238159 A1 | 10/2005 | Halsell et al. | |
| 2005/0273850 A1 | 12/2005 | Freund | |
| 2006/0075230 A1 | 4/2006 | Baird et al. | |
| 2006/0085840 A1* | 4/2006 | Bruck | H04N 21/42684 |
| | | | 348/E7.069 |
| 2006/0190486 A1 | 8/2006 | Zhou et al. | |
| 2007/0143860 A1 | 6/2007 | Hardt | |
| 2007/0214494 A1 | 9/2007 | Uruta et al. | |
| 2007/0239730 A1 | 10/2007 | Vigelette et al. | |
| 2008/0263632 A1 | 10/2008 | Keon | |
| 2008/0289006 A1 | 11/2008 | Hock et al. | |
| 2009/0017847 A1 | 1/2009 | Mendiola et al. | |
| 2009/0127332 A1 | 5/2009 | Park et al. | |
| 2009/0282256 A1 | 11/2009 | Rakic et al. | |
| 2009/0288143 A1 | 11/2009 | Stebila et al. | |
| 2009/0292814 A1 | 11/2009 | Ting et al. | |
| 2009/0292927 A1 | 11/2009 | Wenzel et al. | |
| 2010/0088696 A1 | 4/2010 | Stoev et al. | |
| 2010/0107229 A1 | 4/2010 | Najafi et al. | |
| 2010/0317320 A1* | 12/2010 | Sakargayan | H04L 63/08 |
| | | | 455/410 |
| 2011/0010701 A1 | 1/2011 | Cooper et al. | |
| 2011/0125511 A1 | 5/2011 | Bakst | |
| 2011/0125550 A1 | 5/2011 | Erhart et al. | |
| 2011/0130172 A1 | 6/2011 | Rao | |
| 2011/0142234 A1 | 6/2011 | Rogers | |
| 2011/0153740 A1 | 6/2011 | Smith et al. | |
| 2011/0197287 A1 | 8/2011 | Hess et al. | |
| 2011/0246196 A1 | 10/2011 | Bhaskaran | |
| 2011/0282706 A1 | 11/2011 | Ezra et al. | |
| 2012/0047147 A1 | 2/2012 | Redstone et al. | |
| 2012/0054357 A1 | 3/2012 | Kuritzky et al. | |
| 2012/0072979 A1 | 3/2012 | Cha et al. | |
| 2012/0110072 A1 | 5/2012 | de Villiers | |
| 2012/0124367 A1 | 5/2012 | Ota et al. | |
| 2012/0137340 A1 | 5/2012 | Jakobsson et al. | |
| 2012/0201381 A1 | 8/2012 | Miller et al. | |
| 2012/0215621 A1 | 8/2012 | Heffernan et al. | |
| 2012/0226678 A1 | 9/2012 | Park et al. | |
| 2012/0264405 A1 | 10/2012 | Bravo et al. | |
| 2012/0278241 A1* | 11/2012 | Brown | H04W 12/068 |
| | | | 705/67 |
| 2013/0035982 A1 | 2/2013 | Zhang et al. | |
| 2013/0036459 A1 | 2/2013 | Liberman et al. | |
| 2013/0055348 A1 | 2/2013 | Strauss et al. | |
| 2013/0090084 A1 | 4/2013 | Cherubini et al. | |
| 2013/0097651 A1 | 4/2013 | Rendahl et al. | |
| 2013/0110765 A1 | 5/2013 | Heidasch | |
| 2013/0111208 A1* | 5/2013 | Sabin | G06F 21/36 |
| | | | 713/176 |
| 2013/0122934 A1 | 5/2013 | Branch et al. | |
| 2013/0124539 A1 | 5/2013 | Lin et al. | |
| 2013/0166918 A1 | 6/2013 | Shahbazi et al. | |
| 2013/0173333 A1 | 7/2013 | Zhang et al. | |
| 2013/0179681 A1 | 7/2013 | Benson et al. | |
| 2013/0232543 A1 | 9/2013 | Cheng et al. | |
| 2013/0254283 A1 | 9/2013 | Garcia-Martinez et al. | |
| 2013/0254849 A1* | 9/2013 | Alison | H04L 63/123 |
| | | | 726/4 |
| 2013/0263021 A1 | 10/2013 | Dunn et al. | |
| 2013/0268994 A1 | 10/2013 | Cooper et al. | |
| 2013/0276125 A1 | 10/2013 | Bailey | |
| 2013/0282589 A1 | 10/2013 | Shoup et al. | |
| 2013/0290475 A1 | 10/2013 | Flagg et al. | |
| 2013/0311301 A1 | 11/2013 | Grant et al. | |
| 2013/0314208 A1 | 11/2013 | Risheq et al. | |
| 2013/0337773 A1* | 12/2013 | Nozulak | H04L 63/18 |
| | | | 455/411 |
| 2014/0007196 A1 | 1/2014 | Lin | |
| 2014/0020078 A1 | 1/2014 | Canning et al. | |
| 2014/0032758 A1 | 1/2014 | Barton et al. | |
| 2014/0040020 A1 | 2/2014 | Shanmugam et al. | |
| 2014/0047510 A1 | 2/2014 | Belton et al. | |
| 2014/0059029 A1 | 2/2014 | Magill et al. | |

(56) References Cited

U.S. PATENT DOCUMENTS

| | | | |
|---|---|---|---|
| 2014/0095874 A1* | 4/2014 | Desai | H04L 63/0815 713/168 |
| 2014/0123157 A1 | 5/2014 | Keskitalo et al. | |
| 2014/0130159 A1 | 5/2014 | Raman | |
| 2014/0157390 A1 | 6/2014 | Lurey et al. | |
| 2014/0157401 A1 | 6/2014 | Alameh et al. | |
| 2014/0172837 A1 | 6/2014 | Sommer | |
| 2014/0173754 A1 | 6/2014 | Barbir | |
| 2014/0221012 A1 | 8/2014 | Uetabira | |
| 2014/0223009 A1* | 8/2014 | Ohkuma | H04L 63/0815 709/225 |
| 2014/0223532 A1* | 8/2014 | Satoh | H04L 63/0815 726/7 |
| 2014/0241519 A1 | 8/2014 | Watson et al. | |
| 2014/0250499 A1 | 9/2014 | Vercruysse | |
| 2014/0258547 A1 | 9/2014 | Scavo et al. | |
| 2014/0273963 A1 | 9/2014 | Su et al. | |
| 2014/0279038 A1 | 9/2014 | Lombard | |
| 2014/0282870 A1 | 9/2014 | Markwordt et al. | |
| 2014/0282964 A1 | 9/2014 | Stubblefield | |
| 2014/0282977 A1 | 9/2014 | Madhu et al. | |
| 2014/0297342 A1 | 10/2014 | Ogata et al. | |
| 2014/0317689 A1 | 10/2014 | Mogush | |
| 2014/0330651 A1 | 11/2014 | Klemm et al. | |
| 2014/0355039 A1 | 12/2014 | Tsujimoto et al. | |
| 2014/0365782 A1 | 12/2014 | Beatson et al. | |
| 2015/0025980 A1 | 1/2015 | Zaretsky et al. | |
| 2015/0026477 A1 | 1/2015 | Malatack et al. | |
| 2015/0028996 A1 | 1/2015 | Agrafioti et al. | |
| 2015/0046340 A1 | 2/2015 | Dimmick | |
| 2015/0066745 A1 | 3/2015 | Lee | |
| 2015/0074118 A1 | 3/2015 | Garcia-sanchez et al. | |
| 2015/0089585 A1 | 3/2015 | Novack | |
| 2015/0089613 A1 | 3/2015 | Tippett et al. | |
| 2015/0095137 A1 | 4/2015 | Savelli et al. | |
| 2015/0106924 A1 | 4/2015 | Shahbazi | |
| 2015/0113007 A1 | 4/2015 | Hatchard et al. | |
| 2015/0113627 A1* | 4/2015 | Curtis | H04L 63/08 726/10 |
| 2015/0119002 A1 | 4/2015 | Chen et al. | |
| 2015/0121504 A1* | 4/2015 | Lin | H04L 63/0876 726/9 |
| 2015/0124963 A1 | 5/2015 | Mccusker et al. | |
| 2015/0127678 A1 | 5/2015 | Alvi et al. | |
| 2015/0134433 A1 | 5/2015 | Muller | |
| 2015/0135296 A1 | 5/2015 | Cason et al. | |
| 2015/0149373 A1 | 5/2015 | Chhaya et al. | |
| 2015/0149529 A1 | 5/2015 | Loader et al. | |
| 2015/0195295 A1 | 7/2015 | Sandler et al. | |
| 2015/0199528 A1* | 7/2015 | Bobinski | G06F 8/61 713/191 |
| 2015/0199645 A1 | 7/2015 | Sulur et al. | |
| 2015/0205794 A1 | 7/2015 | Allen et al. | |
| 2015/0220718 A1* | 8/2015 | Hong | H04L 63/18 726/9 |
| 2015/0227725 A1 | 8/2015 | Grigg et al. | |
| 2015/0229624 A1 | 8/2015 | Grigg et al. | |
| 2015/0242605 A1 | 8/2015 | Du et al. | |
| 2015/0245204 A1 | 8/2015 | Heydon | |
| 2015/0261756 A1 | 9/2015 | Klemm et al. | |
| 2015/0264084 A1 | 9/2015 | Kashyap et al. | |
| 2015/0302302 A1 | 10/2015 | Kim et al. | |
| 2015/0304330 A1 | 10/2015 | Soamboonsrup et al. | |
| 2015/0310434 A1 | 10/2015 | Cheung | |
| 2015/0324563 A1 | 11/2015 | Deutschmann et al. | |
| 2015/0332067 A1 | 11/2015 | Gorod | |
| 2015/0372995 A1* | 12/2015 | Hefter | H04L 63/083 713/171 |
| 2016/0012194 A1 | 1/2016 | Prakash et al. | |
| 2016/0019546 A1 | 1/2016 | Eisen | |
| 2016/0027108 A1 | 1/2016 | Addison | |
| 2016/0028688 A1 | 1/2016 | Chizhov et al. | |
| 2016/0048662 A1 | 2/2016 | Arnoud et al. | |
| 2016/0050203 A1 | 2/2016 | Hefetz | |
| 2016/0050234 A1 | 2/2016 | Choyi et al. | |
| 2016/0055326 A1 | 2/2016 | Votaw et al. | |
| 2016/0055487 A1 | 2/2016 | Votaw et al. | |
| 2016/0070704 A1 | 3/2016 | Yu | |
| 2016/0087952 A1 | 3/2016 | Tartz et al. | |
| 2016/0087955 A1 | 3/2016 | Mohamad Abdul et al. | |
| 2016/0087957 A1 | 3/2016 | Shah et al. | |
| 2016/0105801 A1 | 4/2016 | Wittenberg et al. | |
| 2016/0110083 A1 | 4/2016 | Kranendonk et al. | |
| 2016/0112389 A1 | 4/2016 | Bortolamiol | |
| 2016/0112397 A1 | 4/2016 | Mankovskii | |
| 2016/0117328 A1 | 4/2016 | Mondal et al. | |
| 2016/0117355 A1 | 4/2016 | Krishnamurthy | |
| 2016/0132904 A1 | 5/2016 | Mondal et al. | |
| 2016/0134599 A1 | 5/2016 | Ross et al. | |
| 2016/0140466 A1 | 5/2016 | Sidebottom et al. | |
| 2016/0142405 A1* | 5/2016 | Deffeyes | G06V 40/70 726/7 |
| 2016/0142532 A1 | 5/2016 | Bostick et al. | |
| 2016/0149891 A1 | 5/2016 | Kuper et al. | |
| 2016/0155089 A1 | 6/2016 | Nakashima et al. | |
| 2016/0164922 A1 | 6/2016 | Boss et al. | |
| 2016/0171513 A1 | 6/2016 | Takeda et al. | |
| 2016/0173500 A1 | 6/2016 | Sharabi et al. | |
| 2016/0180068 A1 | 6/2016 | Das et al. | |
| 2016/0182556 A1 | 6/2016 | Tatourian et al. | |
| 2016/0183092 A1 | 6/2016 | Carlson | |
| 2016/0217489 A1 | 7/2016 | Allard et al. | |
| 2016/0219027 A1 | 7/2016 | Kaplan et al. | |
| 2016/0226911 A1 | 8/2016 | Boss et al. | |
| 2016/0239573 A1 | 8/2016 | Albert et al. | |
| 2016/0239649 A1 | 8/2016 | Zhao | |
| 2016/0239657 A1 | 8/2016 | Loughlin-mchugh et al. | |
| 2016/0262013 A1 | 9/2016 | Redberg et al. | |
| 2016/0285633 A1 | 9/2016 | Allinson et al. | |
| 2016/0328216 A1 | 11/2016 | Leonelli et al. | |
| 2016/0337351 A1 | 11/2016 | Spencer et al. | |
| 2016/0337403 A1 | 11/2016 | Stoops et al. | |
| 2016/0350309 A1 | 12/2016 | Chatterjee et al. | |
| 2016/0366589 A1 | 12/2016 | Jean | |
| 2016/0381227 A1 | 12/2016 | Singh et al. | |
| 2016/0381548 A1 | 12/2016 | Lauer et al. | |
| 2017/0006012 A1 | 1/2017 | Deluca et al. | |
| 2017/0006020 A1 | 1/2017 | Falodiya | |
| 2017/0019873 A1* | 1/2017 | Britt | G06Q 30/0261 |
| 2017/0034160 A1 | 2/2017 | Brands et al. | |
| 2017/0039476 A1 | 2/2017 | Eyring et al. | |
| 2017/0046714 A1 | 2/2017 | Van De Velde et al. | |
| 2017/0053280 A1 | 2/2017 | Lishok et al. | |
| 2017/0064020 A1 | 3/2017 | Obukhov et al. | |
| 2017/0076293 A1 | 3/2017 | Cage et al. | |
| 2017/0085568 A1 | 3/2017 | Rolfe et al. | |
| 2017/0091289 A1 | 3/2017 | Ohazulike et al. | |
| 2017/0093829 A1 | 3/2017 | Gitlin et al. | |
| 2017/0099280 A1 | 4/2017 | Goel et al. | |
| 2017/0099358 A1 | 4/2017 | Perez et al. | |
| 2017/0111349 A1 | 4/2017 | Sun | |
| 2017/0118209 A1 | 4/2017 | Saravanan | |
| 2017/0118211 A1 | 4/2017 | Murthy et al. | |
| 2017/0126509 A1 | 5/2017 | Jones-mcfadden et al. | |
| 2017/0132203 A1 | 5/2017 | Kim et al. | |
| 2017/0134366 A1 | 5/2017 | Genner et al. | |
| 2017/0140141 A1 | 5/2017 | Yan et al. | |
| 2017/0140643 A1 | 5/2017 | Puppo | |
| 2017/0142035 A1 | 5/2017 | Bradley et al. | |
| 2017/0149776 A1* | 5/2017 | Hyun | H04L 9/3234 |
| 2017/0149843 A1 | 5/2017 | Amulothu et al. | |
| 2017/0154359 A1 | 6/2017 | Zukerman | |
| 2017/0161272 A1 | 6/2017 | Tada et al. | |
| 2017/0169264 A1* | 6/2017 | Britt | G06Q 10/087 |
| 2017/0169433 A1 | 6/2017 | De Magalhaes et al. | |
| 2017/0169640 A1 | 6/2017 | Britt | |
| 2017/0171181 A1* | 6/2017 | Britt | H04W 12/03 |
| 2017/0180539 A1 | 6/2017 | Payack | |
| 2017/0195879 A1 | 7/2017 | Jones-mcfadden | |
| 2017/0201520 A1* | 7/2017 | Chandoor | H04W 12/35 |
| 2017/0201550 A1 | 7/2017 | Benson et al. | |
| 2017/0221156 A1 | 8/2017 | Mingarelli et al. | |
| 2017/0272941 A1* | 9/2017 | Hanay | H04W 12/041 |

(56) References Cited

U.S. PATENT DOCUMENTS

| | | |
|---|---|---|
| 2017/0277691 A1 | 9/2017 | Agarwal |
| 2017/0279789 A1* | 9/2017 | Miao .................... H04L 63/083 |
| 2017/0300946 A1 | 10/2017 | Wilkinson et al. |
| 2017/0308902 A1* | 10/2017 | Quiroga ............... G06Q 20/351 |
| 2017/0318007 A1 | 11/2017 | Cleeve |
| 2017/0324729 A1 | 11/2017 | Hon et al. |
| 2017/0339631 A1 | 11/2017 | Pugaczewski et al. |
| 2017/0347264 A1 | 11/2017 | Holland et al. |
| 2017/0353442 A1 | 12/2017 | Burch et al. |
| 2017/0353456 A1 | 12/2017 | Coronel et al. |
| 2017/0364912 A1 | 12/2017 | Ross et al. |
| 2017/0374090 A1 | 12/2017 | Mcgrew et al. |
| 2018/0007062 A1 | 1/2018 | Maheshwari et al. |
| 2018/0032722 A1 | 2/2018 | Carlson et al. |
| 2018/0034798 A1* | 2/2018 | Vincent ................... H04L 63/18 |
| 2018/0048472 A1 | 2/2018 | Pirrwitz et al. |
| 2018/0054467 A1 | 2/2018 | Abou Mahmoud et al. |
| 2018/0089318 A1 | 3/2018 | Chatterjee et al. |
| 2018/0110475 A1 | 4/2018 | Shaya |
| 2018/0113952 A1 | 4/2018 | Brown |
| 2018/0114216 A1 | 4/2018 | Joseph et al. |
| 2018/0124033 A1 | 5/2018 | Greenspan et al. |
| 2018/0130002 A1 | 5/2018 | Dekoekkoek et al. |
| 2018/0139206 A1 | 5/2018 | Ezell et al. |
| 2018/0158061 A1 | 6/2018 | Edelstein et al. |
| 2018/0158100 A1 | 6/2018 | Barak et al. |
| 2018/0176212 A1 | 6/2018 | Nair |
| 2018/0196813 A1 | 7/2018 | Lin et al. |
| 2018/0197128 A1 | 7/2018 | Carstens et al. |
| 2018/0204260 A1 | 7/2018 | Mcgregor et al. |
| 2018/0218356 A1 | 8/2018 | Grassadonia et al. |
| 2018/0227128 A1* | 8/2018 | Church ................. H04L 9/3247 |
| 2018/0232641 A1 | 8/2018 | Bostick et al. |
| 2018/0234411 A1 | 8/2018 | Masiero et al. |
| 2018/0247271 A1 | 8/2018 | Van Hoang et al. |
| 2018/0247312 A1 | 8/2018 | Loganathan et al. |
| 2018/0262471 A1 | 9/2018 | Pereira et al. |
| 2018/0262484 A1* | 9/2018 | Kesari ..................... H04L 51/42 |
| 2018/0287883 A1 | 10/2018 | Joshi et al. |
| 2018/0293670 A1 | 10/2018 | Yin |
| 2018/0295128 A1 | 10/2018 | Drake et al. |
| 2018/0295146 A1 | 10/2018 | Kovega et al. |
| 2018/0309752 A1 | 10/2018 | Villavicencio et al. |
| 2018/0324126 A1 | 11/2018 | Grant et al. |
| 2018/0337932 A1 | 11/2018 | Juster et al. |
| 2018/0351925 A1 | 12/2018 | Badri et al. |
| 2018/0359244 A1* | 12/2018 | Cockerill ................ H04L 63/12 |
| 2018/0367526 A1 | 12/2018 | Huang et al. |
| 2019/0034976 A1 | 1/2019 | Hamedi et al. |
| 2019/0042656 A1 | 2/2019 | Germishuys |
| 2019/0052722 A1 | 2/2019 | Gasking |
| 2019/0087746 A1 | 3/2019 | Jain et al. |
| 2019/0102459 A1 | 4/2019 | Patterson |
| 2019/0108209 A1 | 4/2019 | Ahuja et al. |
| 2019/0109842 A1 | 4/2019 | Kumar et al. |
| 2019/0124023 A1 | 4/2019 | Conroy et al. |
| 2019/0132323 A1 | 5/2019 | Williams et al. |
| 2019/0139148 A1 | 5/2019 | Piel |
| 2019/0146773 A1 | 5/2019 | Attard |
| 2019/0158491 A1 | 5/2019 | Burmester et al. |
| 2019/0188617 A1 | 6/2019 | Copeland et al. |
| 2019/0197231 A1 | 6/2019 | Meier |
| 2019/0228178 A1 | 7/2019 | Sharma et al. |
| 2019/0245871 A1 | 8/2019 | Ward et al. |
| 2019/0253243 A1 | 8/2019 | Zimmerman et al. |
| 2019/0334943 A1 | 10/2019 | Arvanites et al. |
| 2021/0224799 A1 | 7/2021 | Ongpin et al. |

OTHER PUBLICATIONS

Grassi, Paul A, et al., "Digital Identity Guidelines", NIST Special Publication 800-63C, Jun. 2017, 1-34.

Grassi, Paul A, et al., "Digital Identity Guidelines", NIST Special Publication 800-63 Revision 3, Jun. 2017, 1-53.

Grassi, Paul A, et al., "Digital Identity Guidelines", NIST Special Publication 800-63B, Jun. 2017, 1-55.

* cited by examiner

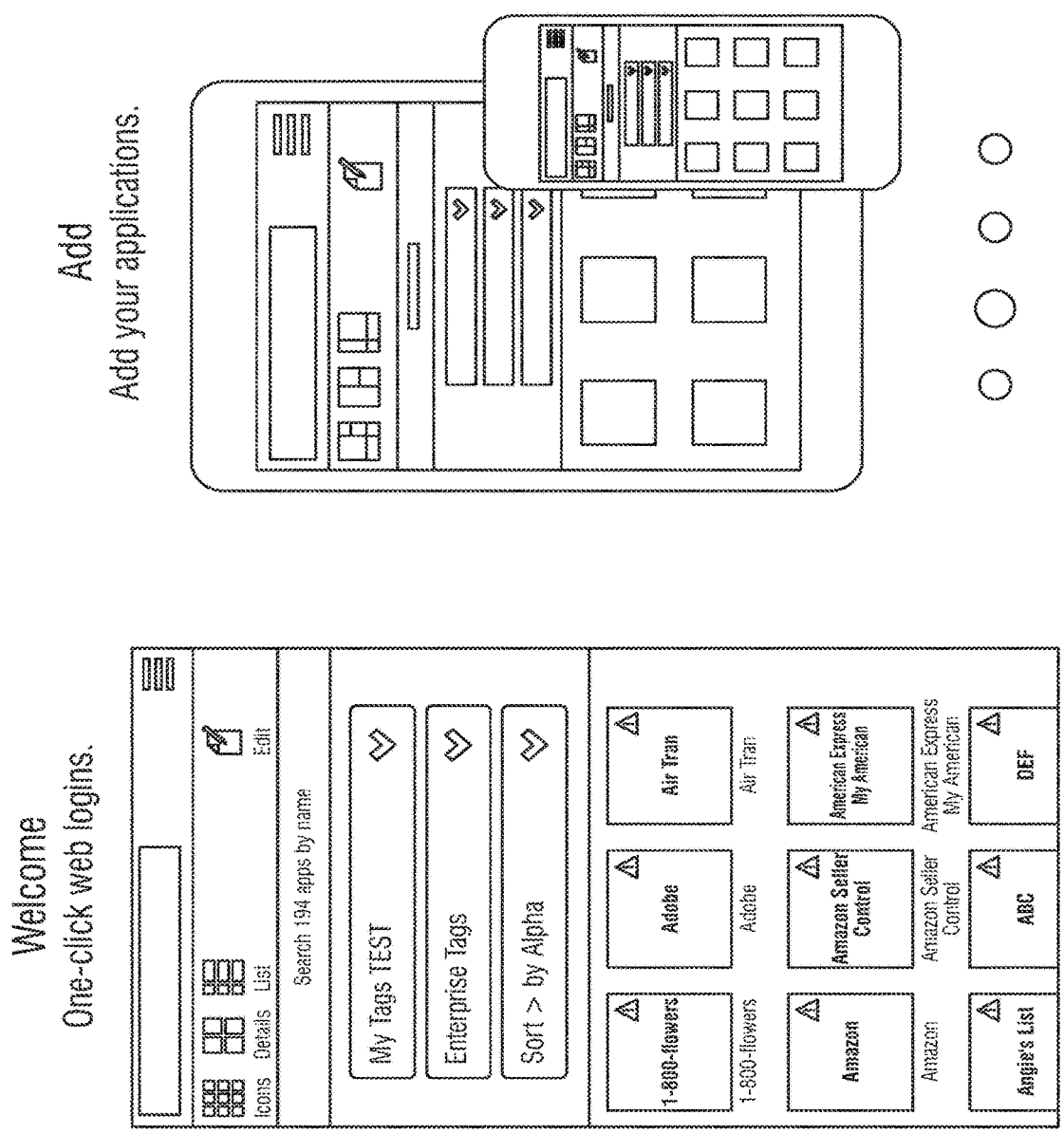

MOBILE DEVICE ENABLED DESKTOP TETHERED AND TETHERLESS AUTHENTICATION

CROSS REFERENCE TO RELATED APPLICATIONS

This patent application is a continuation of U.S. patent application Ser. No. 17/521,611, filed Nov. 8, 2021, which is a continuation of U.S. patent application Ser. No. 15/970,780, MOBILE DEVICE ENABLED DESKTOP TETHERED AND TETHERLESS AUTHENTICATION, filed May 3, 2018, now U.S. Pat. No. 11,171,941, which is a continuation-in-part of U.S. patent application Ser. No. 15/626,997, AGGREGATOR TECHNOLOGY WITHOUT USERNAMES AND PASSWORDS, filed Jun. 19, 2017, now U.S. Pat. No. 9,979,715, which is incorporated herein by reference in its entirety, which is a divisional of U.S. patent application Ser. No. 15/052,747, now U.S. Pat. No. 9,686,273, AGGREGATOR TECHNOLOGY WITHOUT USERNAMES AND PASSWORDS, filed Feb. 24, 2016, which is incorporated herein by reference in its entirety, and additionally claims priority from U.S. Provisional Patent Application No. 62/120,153, SOCIAL SINGLE SIGN-ON AGGREGATOR WITHOUT USERNAMES AND PASSWORDS, filed Feb. 24, 2015, which is also incorporated herein by this reference in its entirety, and this patent application claims priority from U.S. Provisional Patent Application No. 62/501,027, MOBILE DEVICE ENABLED DESKTOP TETHERED AND TETHERLESS AUTHENTICATION AND METHOD AND APPARATUS FOR A SOCIAL NETWORK SCORE AND IDENTITY ASSURANCE SCORE TIES TO ID-LESS AND PASSWORD-LESS AUTHENTICATION SYSTEM, filed May 3, 2017, which is incorporated herein by reference in its entirety.

BACKGROUND OF THE INVENTION

Technical Field

This invention relates generally to the field of digital authentication. More specifically, this invention relates to mobile device enabled desktop tethered and tetherless authentication.

Description of the Related Art

Presently, an individual can log onto their computing device via a mobile device by means such as proximity of the mobile device to the computer. For example, rohos (SafeJKA S.R.L.) performs authentication in a computing device with a Bluetooth® (Bluetooth SIG, Inc., Kirkland, WA) device, in which the mobile device is required to be equipped with Bluetooth®. Proximity identification is limiting because suppose a thief gets hold of a mobile device and brings it close to the computing device. If the computing device allows logging in, because the mobile device is near, the thief then has access to the laptop, which is not a good result.

As well, many organizations rely on technological identity and access management solutions to keep pace with the growth of their organizations, e.g. gaming and hospitality enterprises. Thus, for example, such organizations deploy automated user de-provisioning or password policy enforcement.

In today's environment, partner enterprises allow an external user from one organization outside of their network to have access to an internal application of their organization within their own network. This type of partnership can be referred to as federated identity management. With using federated identity management, an internal application written at Company A can be made publicly available. For a user at Company B on one type of network to access on an entirely different network the internal application written at Company A, the user has to perform the following procedure. The user creates an internal ID at Company A, enters the internal application and maps his external ID from his own network to his internal ID on Company A's network. Further, Company A can allow the user to access their internal application by the user using a social network account, such as a LinkedIn (Mountain View, CA; "LinkedIn") account for example. Then, Company A can link the external user's social network account sign on to Company A's internal application.

The technique described above allows Company A to manage their partners' access to their internal applications.

Today, there's a technology known as federation, which allows an enterprise to manage their partners' access to their internal applications. However, federation requires high maintenance for every partner company and a lot of initial effort to set up and configure.

SUMMARY OF THE INVENTION

A technique is provided that integrates authentication from a mobile device (e.g., using biometrics, social informational data, questions and answers, and more) to allow login to laptops and desktops while they are disconnected from the Internet using a USB cable connection, Bluetooth or local wifi or any other similar protocol and/or connected to Internet without USB. The technique provides a cloud clearinghouse that ties a person's or entity's mobile device(s) to an identity that's used to authenticate a person (could be the same person) on a laptop, desktop, or similar computer system.

BRIEF DESCRIPTION OF THE DRAWINGS

One or more embodiments of the present invention are illustrated by way of example and not limitation in the figures of the accompanying drawings.

FIG. 1 illustrates an example of an interface of a user's page of an aggregator platform, according to an embodiment;

FIG. 9 illustrates an example of a user interface of a delegation page in which a user can enter a delegation type, provider type, provider user name, applicable filters, and a selection of one or more applications to share, according to an embodiment;

FIG. 10 illustrates an example of a user interface showing a sample dropdown list of the provider types of FIG. 9, according to an embodiment;

FIG. 11 illustrates an example of a user interface showing a home page of the aggregator system, according to an embodiment;

FIG. 12 illustrates an example of two different devices, a tablet and a smartphone, each displaying the home page web page of the aggregator system, according to an embodiment;

DETAILED DESCRIPTION

Figure 2:
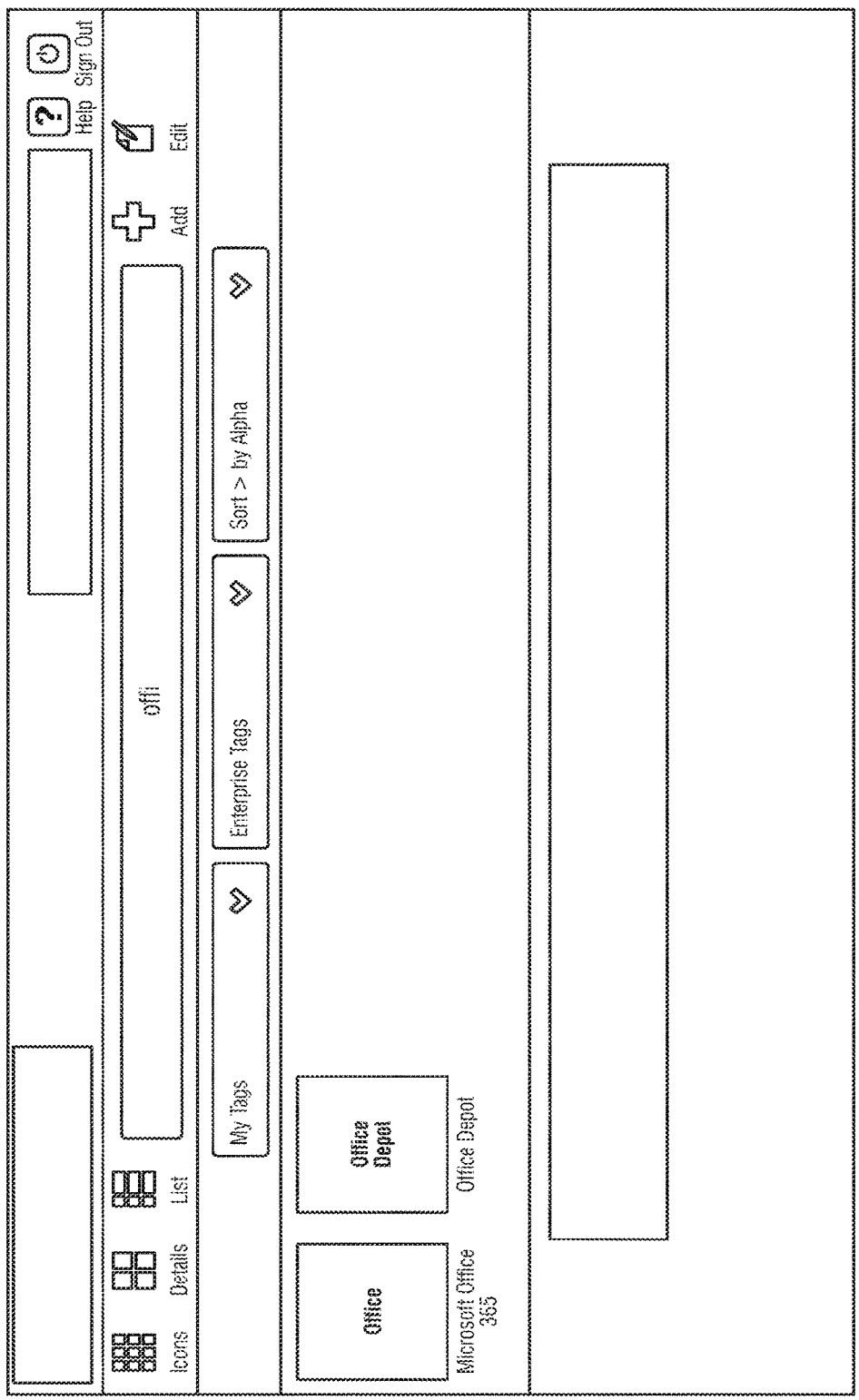
FIG. 2 illustrates an example of a user interface showing two icons representing an enabled application on the aggregator platform and a not-enabled application on the aggregator platform, according to an embodiment.

A technique is provided that integrates authentication from a mobile device (e.g., using biometrics, social informational data, questions and answers, and more) to allow login to laptops and desktops while they are disconnected from the Internet using a USB cable connection, Bluetooth or local wifi or any other similar protocol and/or connected to Internet without USB. The technique provides a cloud clearinghouse that ties a person's or entity's mobile device (s) to an identity that's used to authenticate a person (could be the same person) on a laptop, desktop, or similar computer system.

Also introduced here is a technique with which to access a user's web applications. The user registers and signs on to an aggregator system using any supported login identity provider username and password. When the user registers for the first time, the system collects additional information to verify the user for a subsequent access to the system. The system also automatically creates a system secret username and secret, highly securely generated password, both of which are unknown and inaccessible to the user. The secret username and password are stored in a lightweight directory access protocol (LDAP) server or database or in a distributed cloud database system. The system also maps the login identity provider user name to the secret user name and password for subsequent usage.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

An Exemplary Embodiment of an Aggregator Platform without Usernames and Passwords An exemplary embodiment of an aggregator platform without usernames and passwords is a social single sign-on ("sSSO") platform. It should be appreciated that the technique discussed herein can also refer to the aggregator system or application, depending on the context of the discussion. Such platform comprises a server that aggregates a plurality of web applications both internal to an organization and that are public facing to login identity providers including social networking sites such as for example LinkedIn or Facebook (Menlo Park, CA; "Facebook"). The platform presents the aggregation of such web applications as links provided to a particular user.

Examples of login identity providers include but are not limited to social networking sites, Linkedin and Facebook. A sample non-exhaustive list can be found in FIG. 4, which is described in further detail below.

Figure 1:
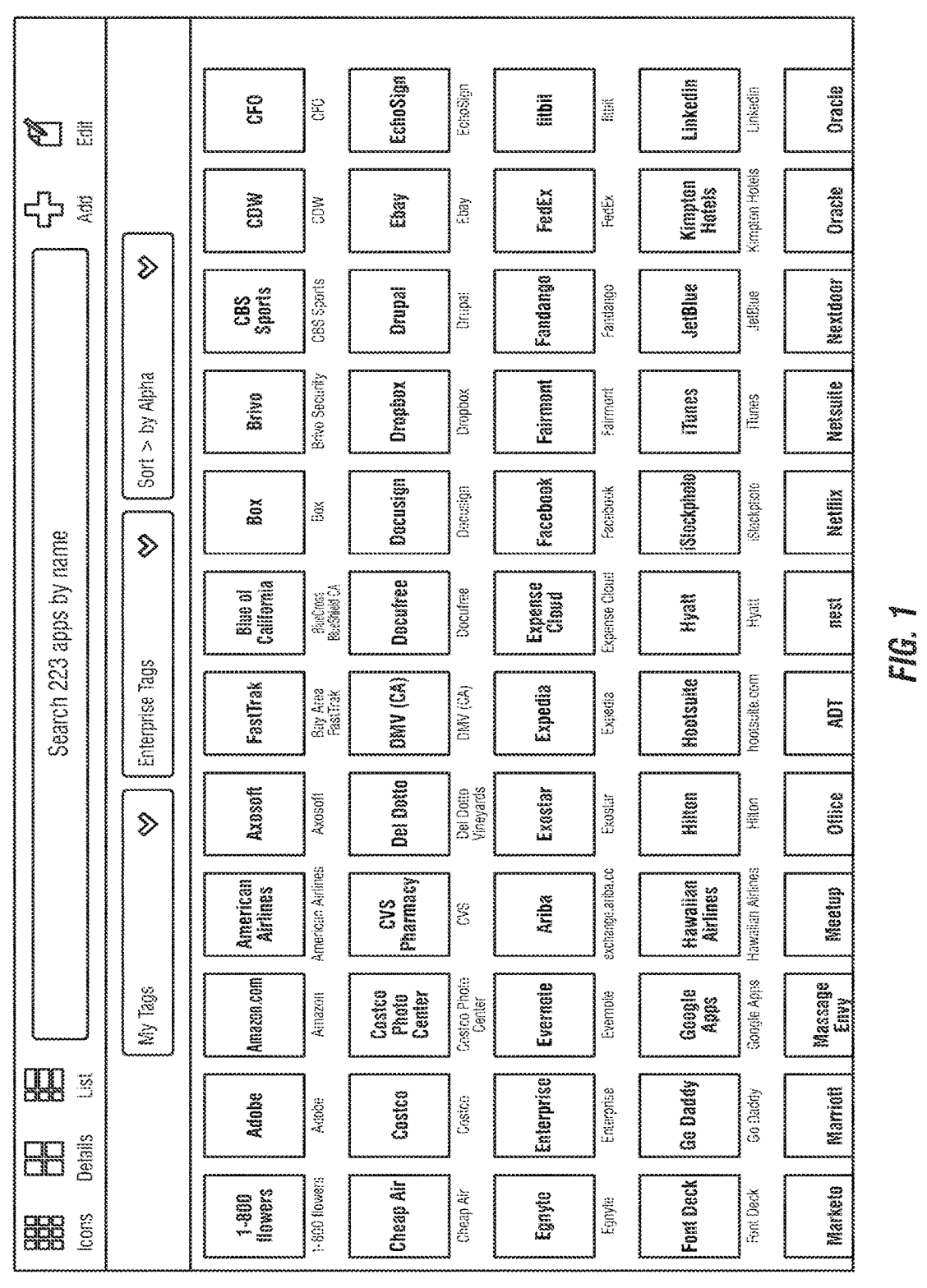

Non-exhaustive examples of web applications that can be aggregated by the server can be found in FIG. 1. FIG. 1 is a sample innovative interface of a user's page on a sSSO application, which displays a collection of web applications which the user had previously added to his sSSO application.

It should be appreciated that the aggregator platform is not limited to the social single sign-on environment. The techniques introduced herein are applicable to aggregators that allow end users to add an application, such that to link to the application at any future time, and from any device, would not need to reenter an ID and/or password. However, employing the social single sign-on implementation of the technique as discussion herein is for purposes of understanding the innovation herein and not for limiting purposes.

To access any of the user's web applications, the user registers and signs on to a social sign-on system ("sSSO") using any supported login identity provider user name and password. For example, the user can register to sSSO using his user name and password that he uses for his Linkedin account. If the user is registering for the first time, the sSSO collects additional information to verify the user later such as for a subsequent access to sSSO. For example, sSSO can collect but is not limited to collecting the user's mobile phone number, questions and answers related to information unique to the user, pictures, biometric data, and/or social information from the identity providers, such as for example information regarding friends, pictures, dates, and conversations. sSSO also automatically creates an sSSO secret user name and a sSSO secret, highly securely generated password. Both such secret user name and secret password are unknown and inaccessible to the user. In an embodiment, this secret user name and secret password are stored in an lightweight directory access protocol (LDAP) server or database or in a distributed cloud database system, etc. sSSO also maps or links the login identity provider user name to the secret user name and password of sSSO system for subsequent usage.

After the user has registered, the user can start using signal sign-on to login automatically to web applications available to the sSSO system. The login identity provider is mapped to the sSSO secret internal user name for purposes of displaying the configured SSO enabled web applications to the appropriate sSSO logged in user. In short, the sSSO secret internal user name is used to display the right apps (web applications) to the right user. Thus, for example, when the user obtains a new, upgraded smartphone, the user does not need to download and reenter the user ID and password for each of his web applications. The user can access any and all of his applications registered in the sSSO from the sSSO application.

FIG. 2 is a sample user interface showing icons representing an enabled and a not enabled SSO application. In this example, the leftmost icon, e.g. Office, represents an SSO enabled application while the icon to the right represents a web application, e.g. Office Depot, that is not enabled. In this example, the sSSO application is configured to display a visual indicator, such as the triangle with the exclamation sign inside, to indicate that such web application is not sSSO enabled.

Figure 3:
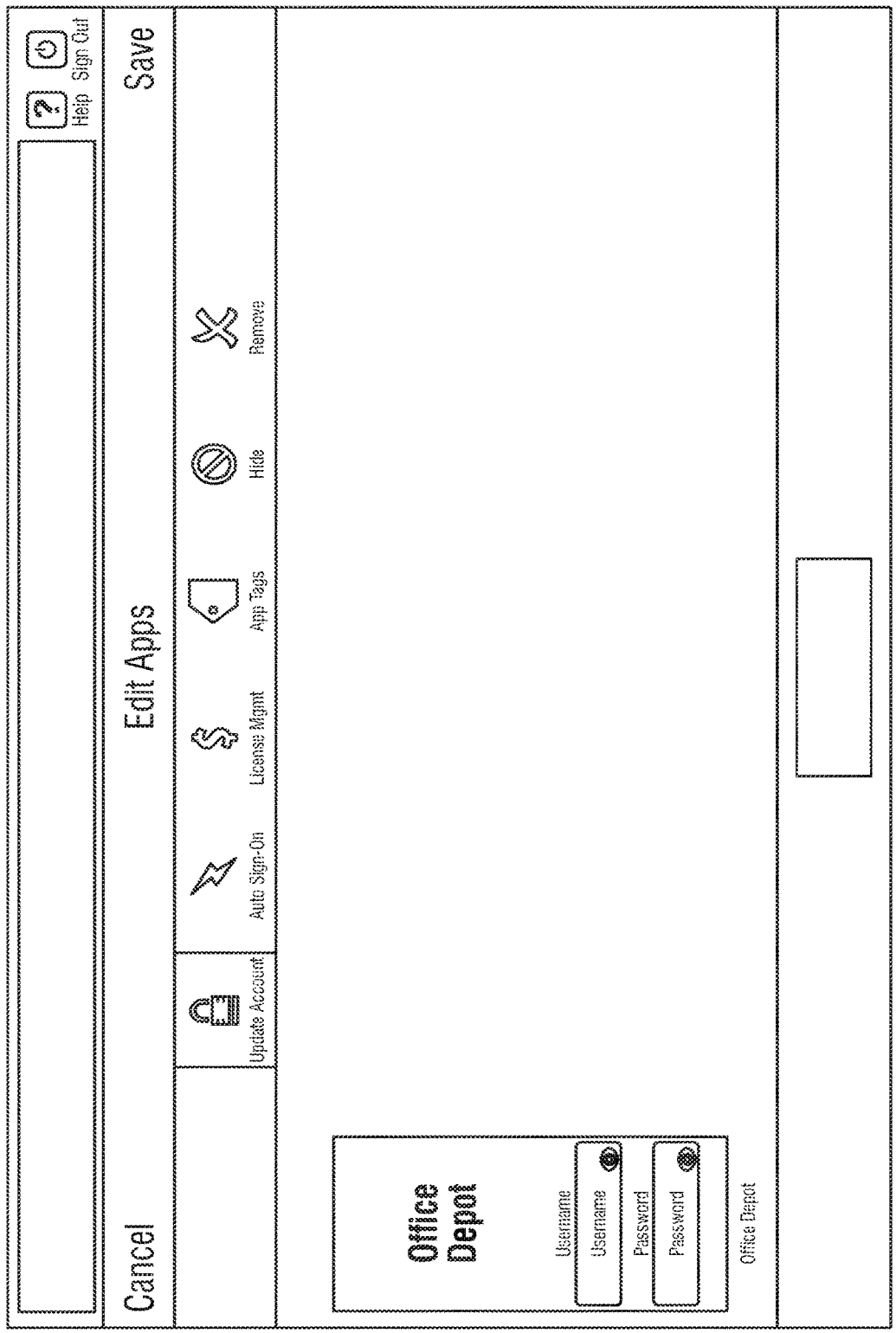
FIG. 3 illustrates an example of a user interface showing a log in graphical user interface (GUI) for a user to add and configure an organization to his aggregator platform, according to an embodiment.

In an embodiment, to enable a web application for sSSO requires entering a user name and optionally a password. An example implementation can be found in FIG. 3. FIG. 3 is a sample user interface of a registration screen to register a particular web application. In the registration screen, a user can enter his or her user name and optionally his or her password for the particular web application.

If the SSO web application, e.g. Office Depot in FIG. 3, is also a login identity provider then sSSO automatically maps or otherwise links the new login identity provider to the sSSO internal secret user name, which enables that login identity provider, e.g. Office Depot, to be used for login in purposes in addition to the existing registered login identity provider, e.g. the original sSSO system. As another example, Facebook and LinkedIn could both be login identity providers to the sSSO system assuming the LinkedIn web application was enabled for single sign-on.

If the sSSO user decides to login using a new unregistered login identity provider, e.g. Facebook, and the user never enabled that login identity provider web application for SSO, the sSSO system will attempt to identify the end user. For example, the sSSO system can go to and use a stored list of usernames and related metadata such as email addresses, actual names, etc., and display candidate selections, e.g. a list of users with similar names from the registered login identity providers, e.g. FACEBOOK: Julie@yahoo.com. That is, the sSSO system prompts the user to pick the login identity provider user name that they recognize. The login identity provider user name can be received by other input means such as for example the user entering his or her user name in a text box, audibly providing the user name, selecting an image that is recognized by the user, providing biometric data such as a finger print, and so on. In addition to using the received user input, the sSSO verifies the identity of the sSSO user by using additional registration information, that is information which was provided by the user when the user registered. For example, such additional registration information can include but is not limited to SMS, Questions/Answers, already registered login identity provider information, biometric information, etc.

Figure 4:
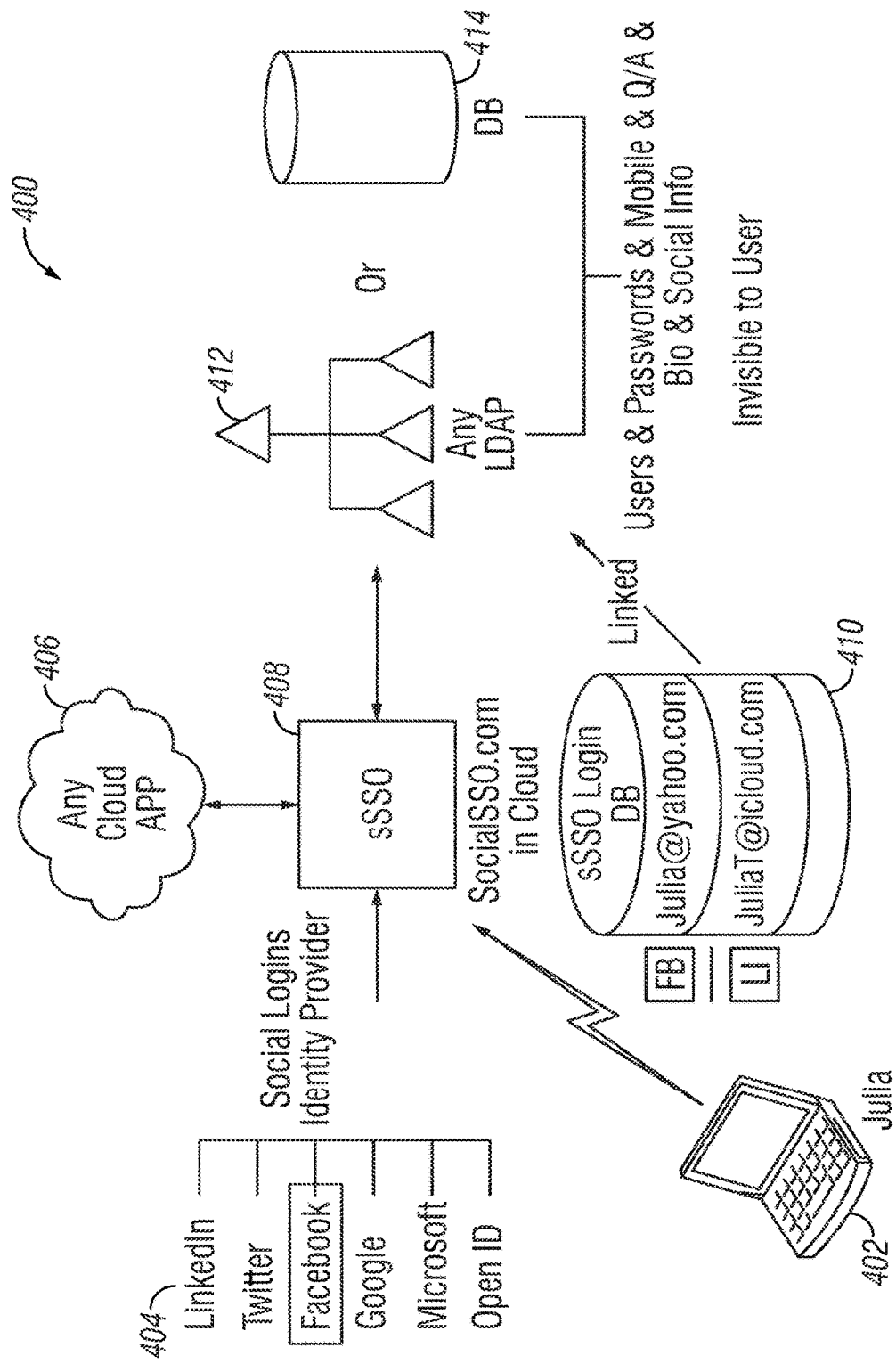
FIG. 4 is a schematic diagram of a system architecture for the aggregator platform, according to an embodiment.

An Exemplary Embodiment of Social Single Sign-On Without Username or Password from a Single Sign-On Provider An embodiment can be understood with reference to FIG. 4. FIG. 4 is a schematic diagram of a system architecture for an aggregator platform, such as for example sSSO, without username or password from the provider, such as for example a SSO provider, 400. A user 402 logs into a social single sign-on (sSSO) application 408, e.g. such as at a website, SocialSSO.com for example, in a network environment such as in a cloud environment. A plurality of social login identity providers 404 are communicably connected with sSSO 408 such that for example a user can log onto sSSO 408 through any of these connected social logins identity providers 404. sSSO 408 is communicably connected to a repository, sSSO login database (DB) 410. In this illustrative example, repository 410 is storing two usernames associated with user 402: *Julia*@yahoo.com associated with her Facebook account and JuliaT@icloud.com associated with her Linkedin account. sSSO 408 is communicably connected to web applications in the cloud 406. When the user registered with sSSO 408, sSSO 408 requested additional data from the user that could be used in identifying the user at subsequent points in time. Types of such data include but are not limited to user data, passwords, mobile data, questions and answers, biometric data, and social data. sSSO 408 stores such data in a second repository 414 via a distributed directory information service over an Internet Protocol (IP) network 412 such as for example a Lightweight Directory Access Protocol (LDAP) system 412. These user names and other data stored in repository 414 and accessible via service 412 are invisible and inaccessible to the users. Thus, user 402 can login to sSSO 408 using any of her existing social usernames (as shown in repository 410) associated with the respective social login identity provider, which is linked to the user's secret data stored in repository 414. Then, after making the link, sSSO proceeds to verify the user by using any of such data in repository 414, such as for example, asking for a cell phone number or a asking a question and expecting a specific answer that matches a stored answer.

Social Federation Social Single Sign-On

Social Federation social single sign-on ("sFed") can be a system, API, or service that enables an organization such as a company, a university, or a government agency, etc. or end user to easily and securely enable an external party such as a contractor, vendor, alumni, family, friends, etc. access to internal (private) and external (public) web applications without using traditional federation technologies or manyually requiring setting up a new user name and password. sFed combined with sSSO easily and securely shares web site login-related data with any user who already has a username and password on a login identity provider website.

Figure 5A:
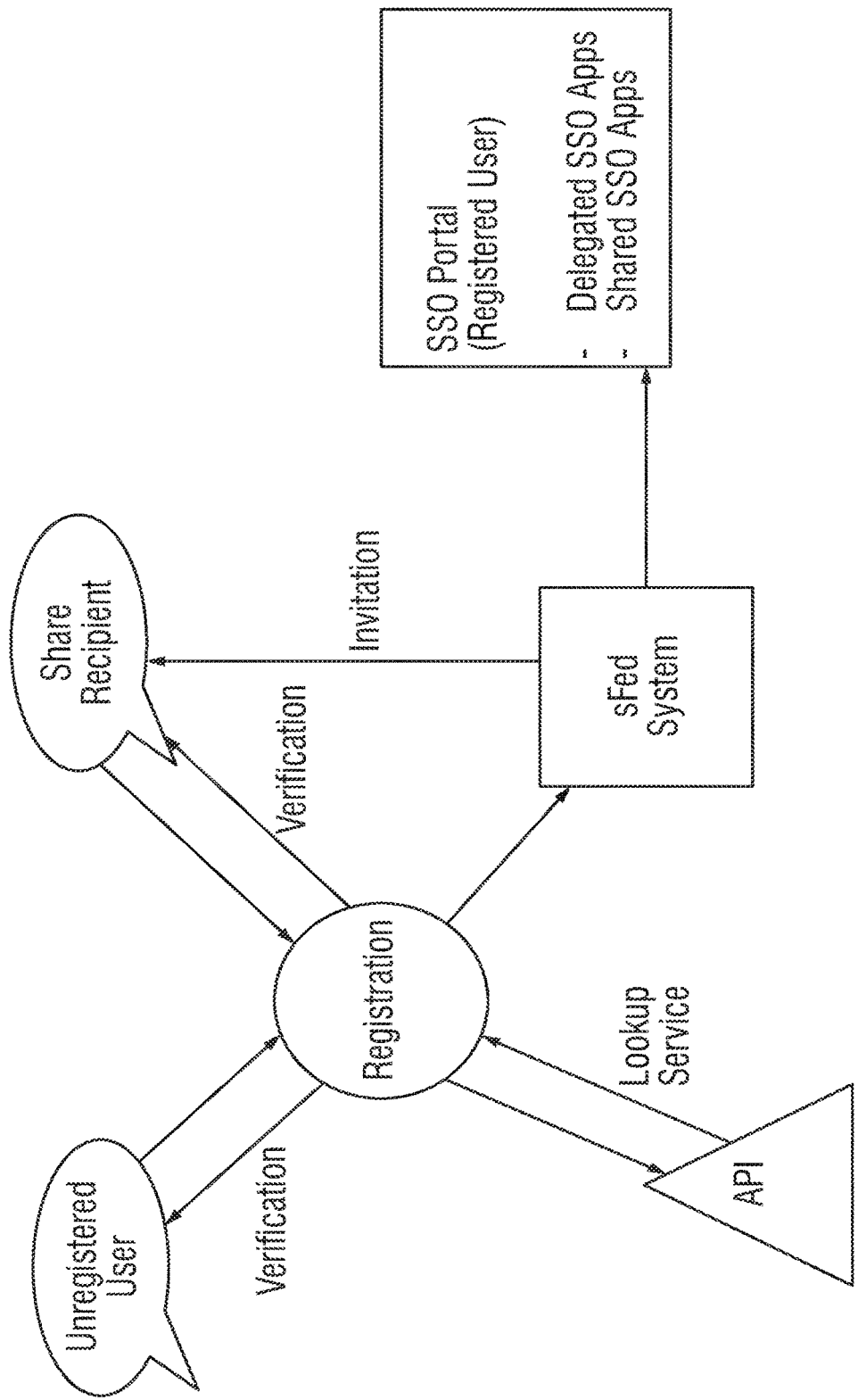
FIG. 5A is a flow diagram of a process for registration to a social federation system, according to an embodiment.

An embodiment of the invention can be understood with reference to FIG. 5A. FIG. 5A is a flow diagram of a process for registration to a social federation system. To use the sFed system requires an external party to register in sSSO or any registered sSSO user to invite an unregistered sSSO user. After they have been registered, the sFed system detects sSSO registration and registered login identity provider user name. Using the sFed system, API, or service, the organization sFed administrator or a sSSO user can delegate (share) sSSO enabled web applications to a registered user or invite an unregistered sSSO user which automatically registers the user into the sSSO system by requiring the invited user to login once to the sSSO system using a login identity provider user name. For example, FACEBOOK: Julie@yahoo.com registers on sSSO and sFed verifies her identity by sending her a SMS token, or question associated with an expected (Q/A), or requiring a biometric confirmation. Thus, in an embodiment, requiring a user to remember and enter login informational data is not needed. sSSO is configured to transmit an alert to the user, where the user can respond with identifying-related data as discussed above.

Figure 5B:
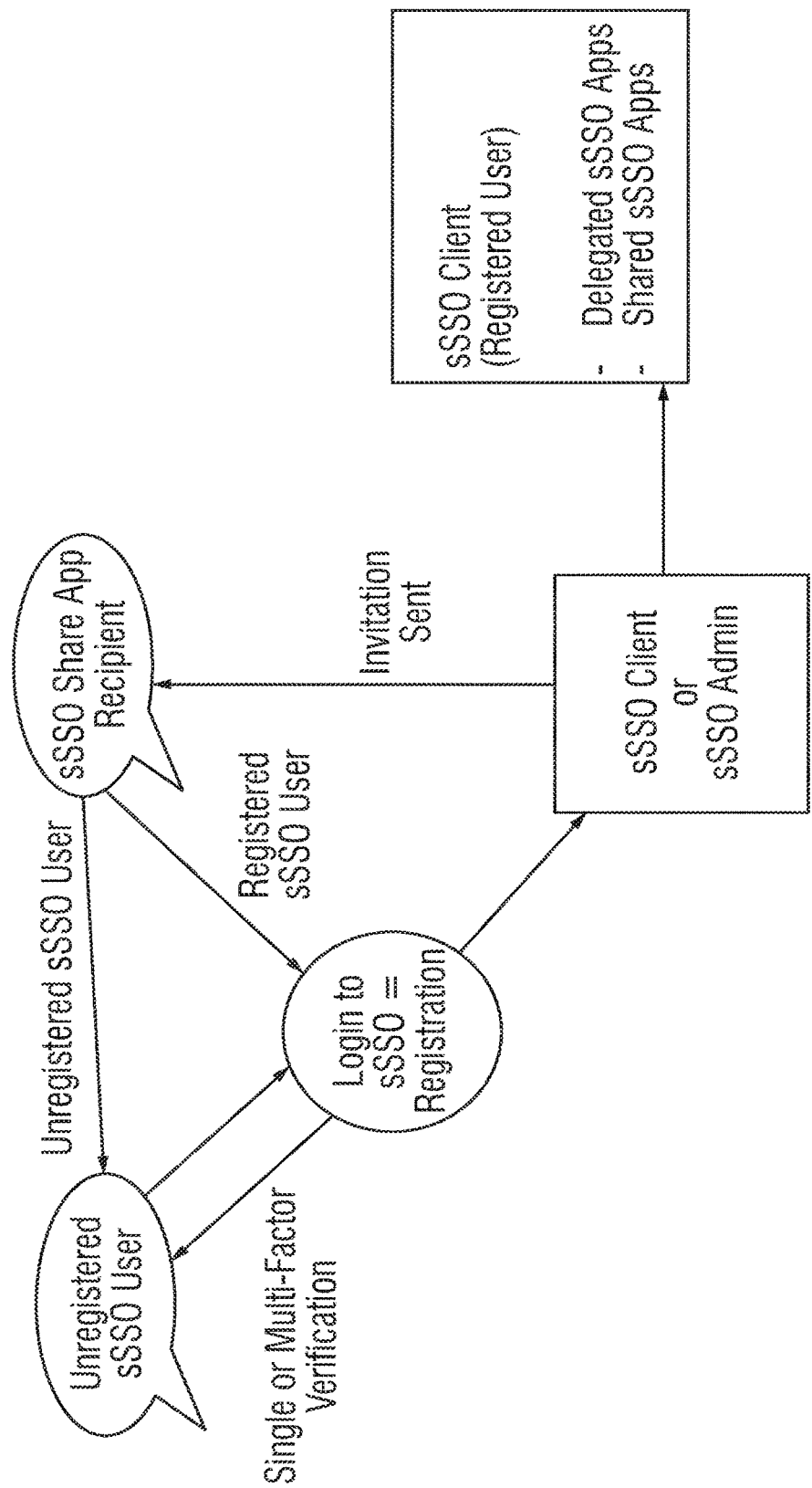
FIG. 5B is a flow diagram of a process for registration to an aggregator system, according to an embodiment.

An embodiment of the invention can be understood with reference to FIG. 5B. FIG. 5B is a process flow for registration to the sSSO system. A user such as an sSSO Client or sSSO Administrator sends an invitation to a recipient, e.g. sSSO Share App Recipient, for the purposes of sharing or delegating an application. If the sSSO recipient is already registered with sSSO, e.g. is a Registered sSSO User, then when such sSSO recipient logs in to sSSO and accepts the invitation, the delegated application is added by the sSSO system to the recipient's collection of sSSO applications. If the sSSO recipient is not yet registered with sSSO, then with the invitation, such recipient is provided the opportunity to register with the sSSO system by providing single or multi-factor verification data. Subsequently, the recipient is a registered sSSO user and the application is added to such user's collection of sSSO applications.

In an embodiment, sSSO enables a user to share login capability along with sharing an application.

Figure 6:
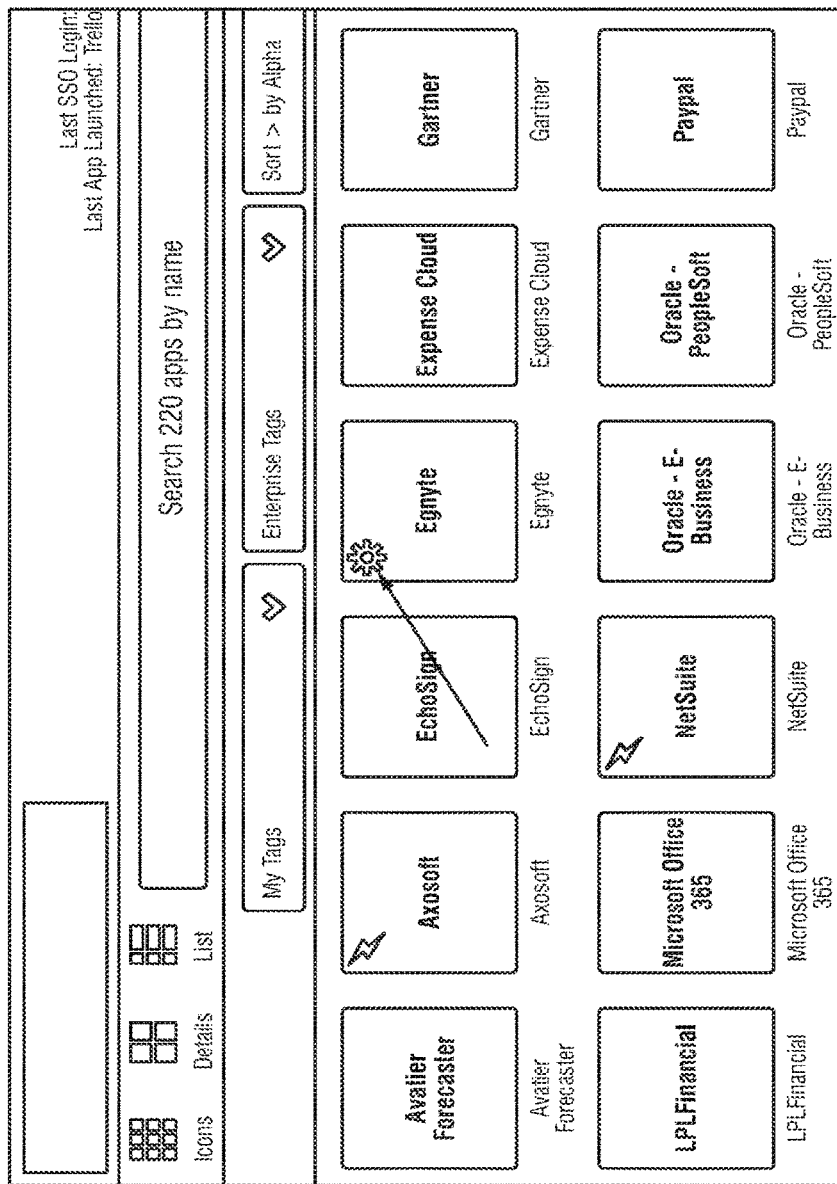
FIG. 6 illustrates an example of a user interface showing an SSO user sharing an application with an unregistered or registered SSO user, according to an embodiment.

FIG. 6 is a sample user interface showing an SSO user sharing an application with an unregistered or registered SSO user. The user initiates the process for the selected SSO application, e.g. Egnyte, by clicking on the icon.

Figure 7:
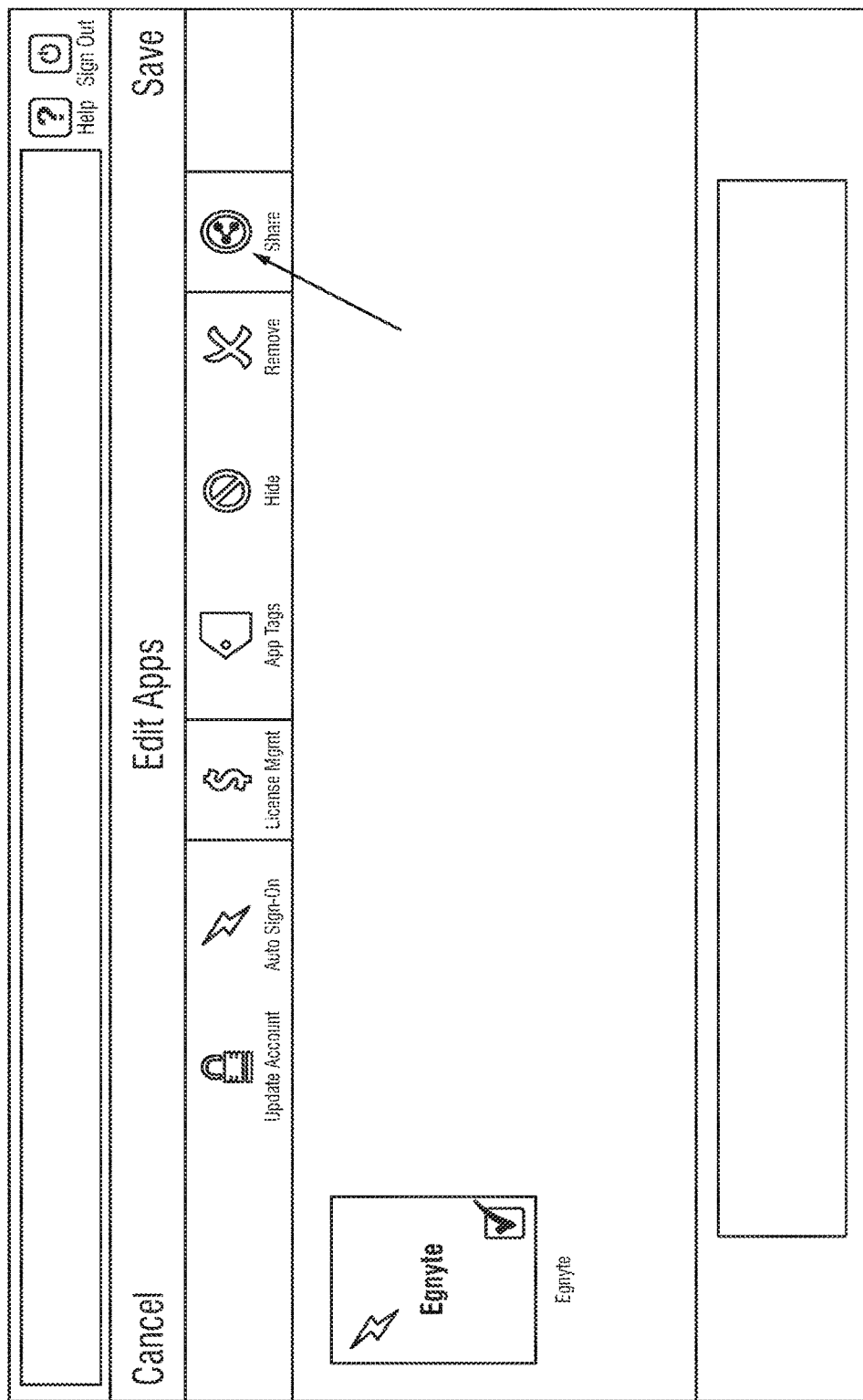
FIG. 7 illustrates an example of a user interface showing a user has selected a Share command to send to a recipient user.

FIG. 7 is a sample user interface showing a user has selected a share command to send to a recipient user. The share command can be sent via multiple methods including but not limited to email, SMS, social network, copying, etc.

Figure 8:
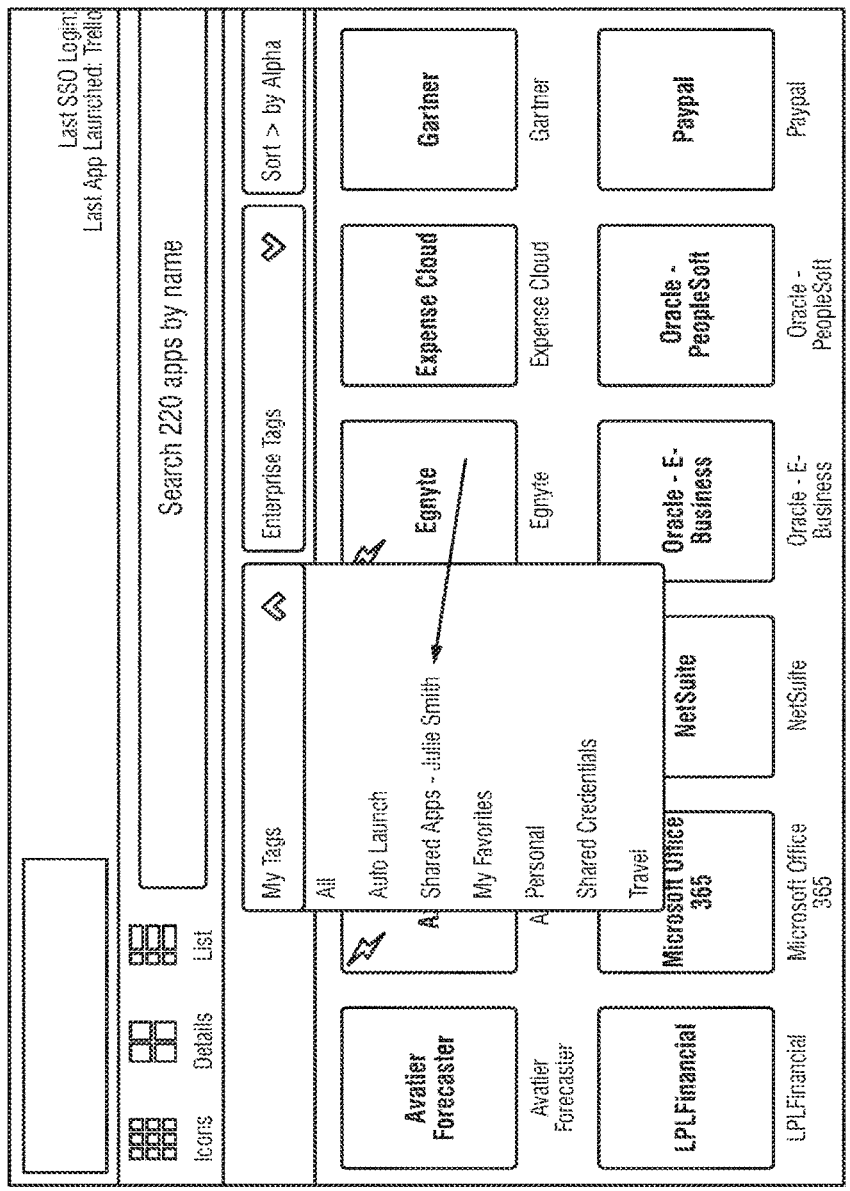
FIG. 8 illustrates an example of a user interface showing how after the SSO user proceeds with registration or log in to SSO, the system provides the user the capability of seeing his shared SSO applications, according to an embodiment.

FIG. 8 is a sample user interface showing how after the SSO user proceeds with registration or login to SSO, they subsequently have capability of seeing or accessing shared SSO applications. For example, the user can access the shared applications by selecting a drop menu that contains a link to a shared apps page. In this example, the system provides a link to shared applications for each recipient.

Figure 9:
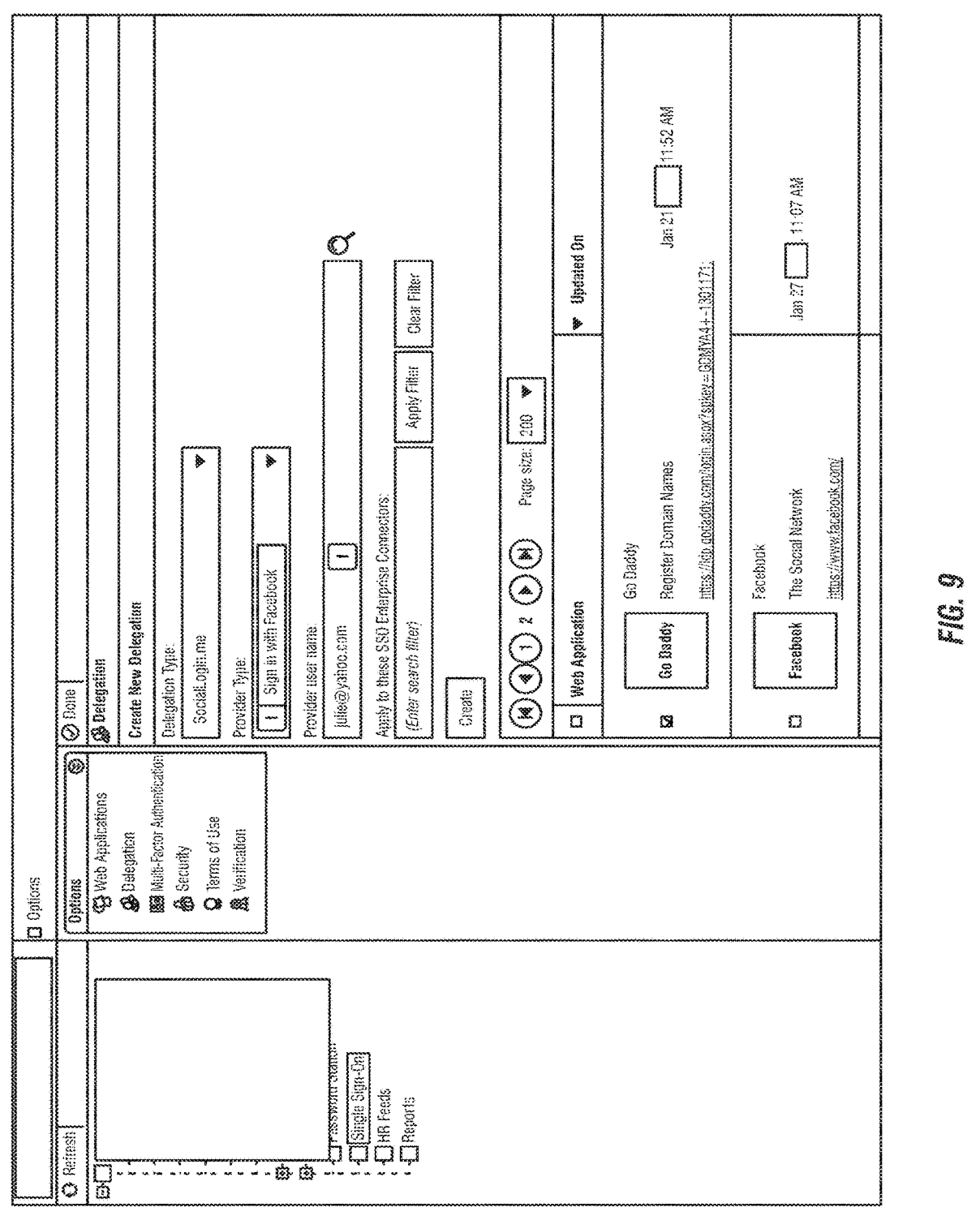

An embodiment provides a sSSO delegation administrator model and corresponding functionality. An administrator can delegate a particular sSSO user to a particular sSSO application, as shown in FIG. 9 for example. FIG. 9 is a sample user interface of a delegation page in which a user can enter a delegation type, e.g. SocialLogin.me, provider type, e.g. Sign in with Facebook, a provider user name, e.g. Julie@yahoo.com, applicable filters, and a selection of one or more applications to share, e.g. Go Daddy.

Figure 10:
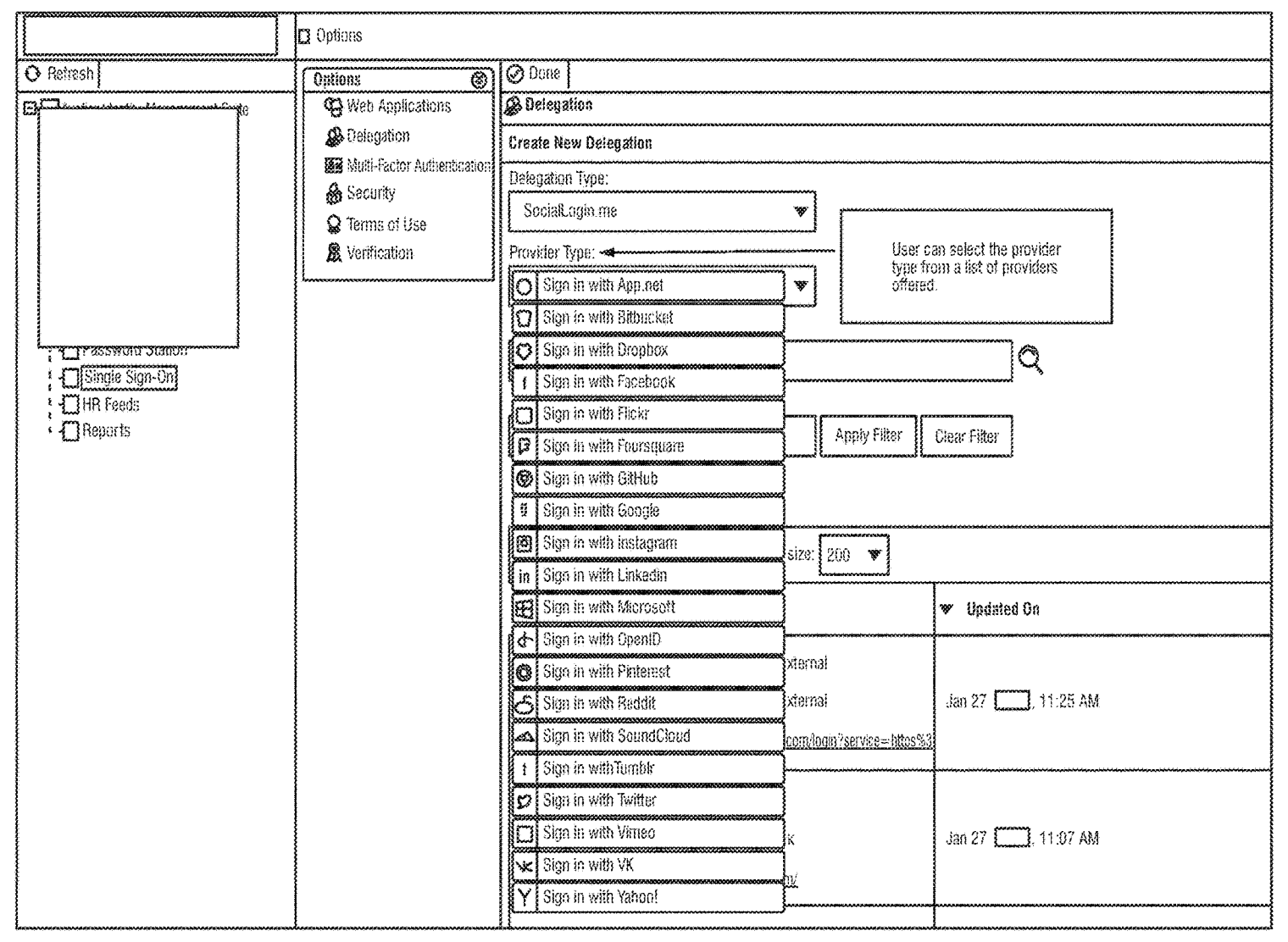

FIG. 10 is a sample user interface showing a non-exhaustive sample dropdown list of the provider types of FIG. 9, each selected type enabling the user to sign in to sSSO and/or sSSO's various enabled web applications or sSSO enterprise connected applications.

If the sFed administrator or sSSO end user is delegating (sharing) a SSO enabled web application, that is using a fixed username and password or a known user name and password to multiple people or shared within the organization to the sSSO user, then system is configured to cause the shared web application to automatically appear on the sSSO users' sSSO interface. For example, sFed uses an API or direct database calls to add the new SSO enabled web application to the user's sSSO interface.

If the sFed administrator is delegating a SSO enabled web application that is using a username and password that is unique to the sSSO user, then sFed automatically creates a user name and password on the enabled web application. For example, sFed can use a format for exchanging authentication and authorization data between parties such as between an identity provider and a service provider, e.g. Security Assertion Markup Language (SAML). Or sFed can use internal methods. Then the SSO enabled web application automatically appears enabled on the sSSO user's sSSO interface.

Web Crawler for Applications Requiring Logons

A technique is introduced by which a web crawler system crawls for web applications that require logons, regardless of content. Each identified web application is added to a database, such as for example the sSSO databases 410 or 414, of such type of applications. In accordance with one technique, the web crawler system discovers a web application and then attempts to logon to the application with a bogus ID and a bogus password. If the attempt is unsuccessful, the web crawler system creates a definition for the web application, where the definition defines attributes of the web application. The web crawler system uses these attributes to categorize the web application within the database. Based on matching the categorization and user profiles, the web crawler system offers the web application to a particular user to add the web application to the user's aggregation of web applications. For instance, the web crawler system can display or send a message to the particular user indicating, "You like bicycles. Perhaps you'd like to add this bicycle application ('bikeapp.com) to your aggregated applications."

Alternate Embodiments

Figure 13:
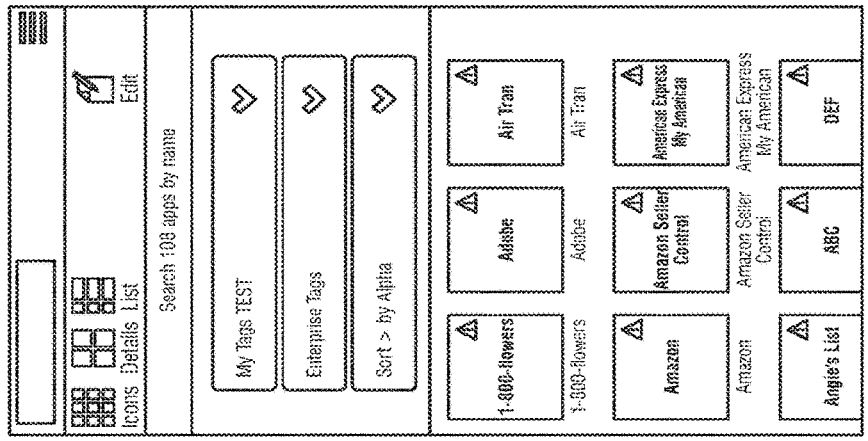
FIG. 13 illustrates an example of a user interface showing four web applications that a user can configure to add to his aggregator system, according to an embodiment.
Figure 14:
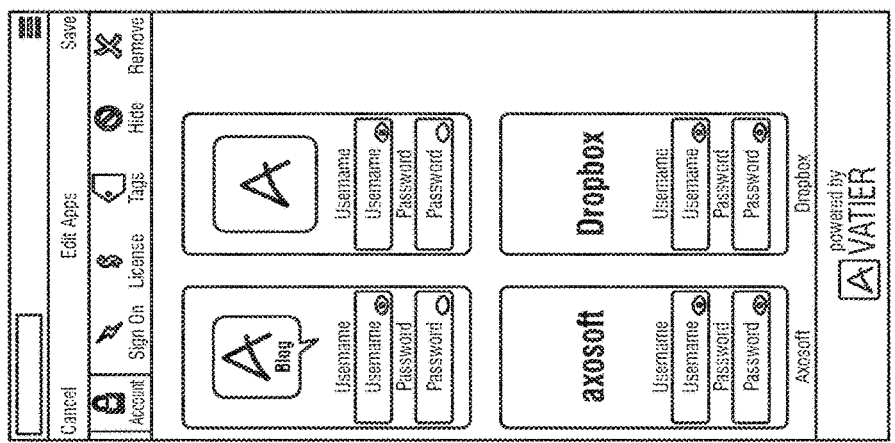
FIG. 14 illustrates an example of a user interface showing icons representing web applications which were added to the system and from which the user can launch with just one click, according to an embodiment.

A smartphone or tablet paradigm or environment illustrates how the innovation solves the technical problem of using computer network resources and bandwidth efficiently by streamlining user interactions with the network. FIG. 11 illustrates an example of a user interface showing a home page of the aggregator system. FIG. 12 illustrates an example of two different devices, a tablet and a smartphone, each displaying the home page web page of the aggregator system. FIG. 13 illustrates an example of a user interface showing four web applications that a user can configure to add to his aggregator system. FIG. 14 illustrates an example of a user interface showing icons representing web applications which were added to the system and from which the user can launch with just one click.

For any new device and in particular for the devices shown, the innovation streamlines user interactions with network, because the user does not need to download and reenter a user ID and password for each of the user's applications. With the technique introduced herein, the user can launch any application already registered in the aggregator platform with a single click, for instance as shown in FIG. 14.

A further efficiency, among others, is afforded the technique introduced here by enabling a user from any device the ability to login with one click to the aggregator system, e.g. as shown in FIG. 11.

A further efficiency is afforded the technique by allowing the user, in addition to launching with one click to a designated application, to add and configure a new application to his already registered applications, as shown in FIGS. 12 and 13.

An Example Machine Overview

Figure 15:
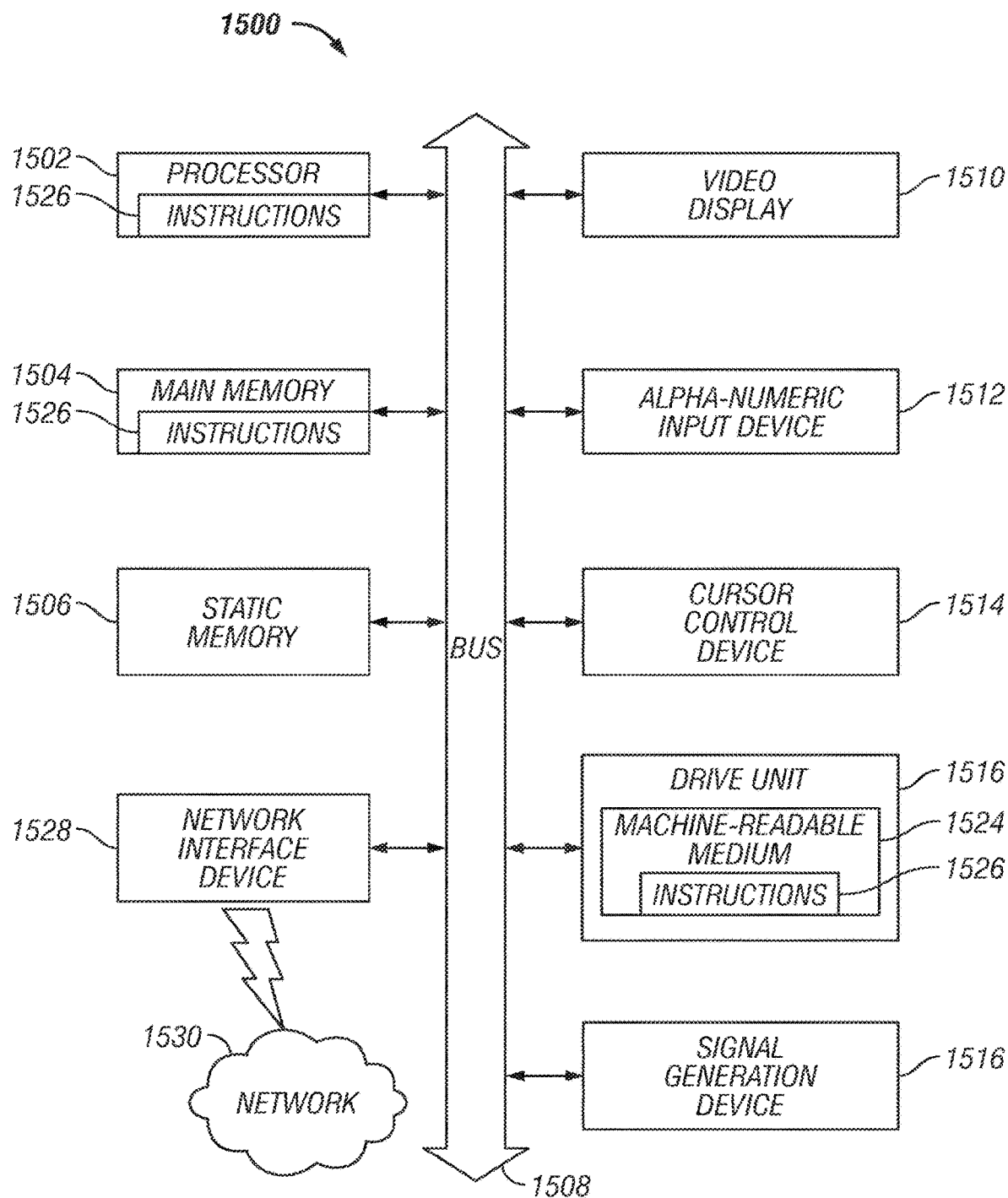
FIG. 15 is a block schematic diagram of a system in the exemplary form of a computer system according to an embodiment.

FIG. 15 is a block schematic diagram of a machine in the exemplary form of a computer system 1500 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1500 includes a processor 1502, a main memory 1504 and a static memory 1506, which communicate with each other via a bus 1508. The computer system 1500 may further include a display unit 1510, for example, a liquid crystal display (LCD) or a cathode ray tube (CRT). The computer system 1500 also includes an alphanumeric input device 1512, for example, a keyboard; a cursor control device 1514, for example, a mouse; a disk drive unit 1516, a signal generation device 1518, for example, a speaker, and a network interface device 1528.

The disk drive unit 1516 includes a machine-readable medium 1524 on which is stored a set of executable instructions, i.e. software, 1526 embodying any one, or all, of the methodologies described herein below. The software 1526 is also shown to reside, completely or at least partially, within the main memory 1504 and/or within the processor 1502. The software 1526 may further be transmitted or received over a network 1530 by means of a network interface device 1528.

In contrast to the system 1500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing computations with cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions that enable users, e.g. users on the go, to login to sSSO web applications using social network identity providers or share sSSO web applications anywhere on such internet-enabled devices, servers, or clients. It further should be appreciated that one or more cloud computing embodiments include allowing a user to login to sSSO web applications using social network identity providers or share sSSO web applications using mobile devices, tablets, and the like, as such devices are becoming standard consumer devices.

Overview of Mobile Device Enabled Desktop Tethered and Tetherless Authentication In accordance with an embodiment, a technique or system integrates authentication from a mobile device (e.g., using biometrics, social, questions and answers, and more) to allow login to laptops and desktops while disconnected from the Internet using a USB cable connection, Bluetooth or local wifi and/or connected to Internet without USB. The innovation provides a cloud clearinghouse that ties a person's or entity's mobile device(s) to an identity that's used to authenticate a person (could be the same person) on a laptop, desktop, or similar computer system.

In an embodiment, an application is installed on the laptop or desktop to recognize the mobile device.

In an embodiment, a Cloud Universal Identification ("Cloud UID") system stores various identifying attributes and aspects of a user or device. For example, in an embodiment, Cloud UID stores and can retrieve for matching: an email address, a social login, an ID from the Cloud UID's database, a numeric ID, a Windows login, or Active Directory ID.

In an embodiment, prior to a login attempt, a credential provider is installed on the user's PC, laptop, Mac, or similar device. The PC, laptop, Mac, or similar device is communicably connected with Cloud UID and this connection allows the credential provider to authenticate the user. In an embodiment, the credential provider communicates with Cloud UID such that it is able to validate a user is who the user claims to be or that the device is what the device claims to be.

In an embodiment, during a login process, the PC, laptop, Mac, or similar device is turned on by a user. It should be appreciated that the user can be any user, not necessarily the person whose account is associated with the PC, laptop, Mac, or similar device. At the display of the PC, laptop, Mac, or similar device, the user is presented with an option to login via mobile device ("mobile login"). Upon selection of mobile login, an alert is sent to the mobile device registered or associated with the PC, laptop, Mac, or similar device. The alert can indicate something like, "Someone is trying to log in to your laptop. Ok to proceed? If so, please reply by clicking the Yes button, otherwise do nothing or click the No button." Thus, for example, suppose Parent 1 is working late at the office, but Child 1 needs to log in to Parent 1's desktop at home. Upon Child 1's turning on the desktop, the credential provider can send a message to Cloud UID requesting authentication. Cloud UID can identify the desktop or any other related identifying data (e.g., an associated email address, etc.) from the message by the credential provider and, because "mobile login" was selected and indicated in the message from the credential provider, look up in its database for a way to communication with the registered mobile device. Upon receiving an affirmative indication from the mobile device via any network, the Cloud UID can retrieve and send the log in information (e.g., ID and password) registered for or associated with the desktop automatically and without user intervention to the desktop, resulting in the desktop being logged into.

In an embodiment, the Cloud UID is configured to implement 1, 2, 3, or N factor authentication in conjunction with sending an alert to the mobile device. That is, the Cloud UID requests further and specific data (e.g., email address, active directory ID, social login, etc.) from the turned-on PC, laptop, Mac, or similar device based on is configured factor authentication.

In an embodiment, an app is provided that can be downloaded from an app store onto the mobile device, in which a user enters an ID, which then ties the ID in the cloud to the mobile device, such as for example, via the phone number of the device.

In an embodiment, a credential provider app can be downloaded from a business site and stored on the computing device to cause the computing device to communicate with the Cloud UID.

In an embodiment, in execution, the laptop or desktop sends a notification to the mobile device to perform the authentication process. Thus, for example, suppose a woman is on a social date and brought her laptop with her. Suppose the woman went to the bathroom and left the laptop with the other person with whom she is out on a date. If this other person tries to logon to the laptop while the woman is out of sight, the innovation causes the woman's cell phone to notify or alert her that someone is requesting authentication to log onto the laptop. The woman can choose to proceed or deny the request to log into the laptop.

In an embodiment, a credential provider installed on the computing device talks to the CUID server to obtain clearance to allow a login request. Once the credential provider program obtains clearance, the credential provider allows the requestor to log in to the computing device.

Figure 16:
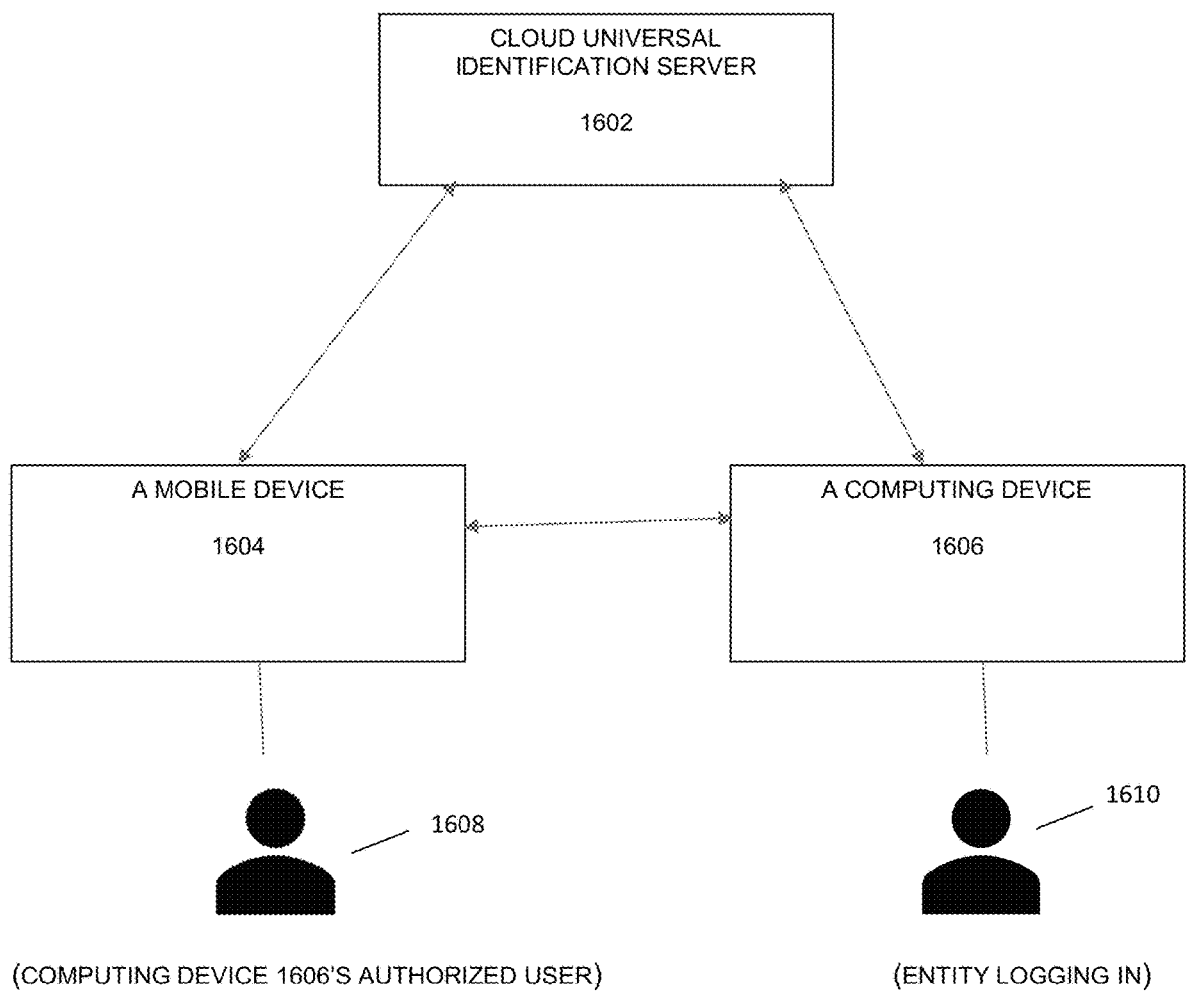
FIG. 16 is a schematic diagram showing the interactions among parties of a cloud clearinghouse authentication system, according to an embodiment.

An Exemplary of Mobile Device Enabled Desktop Tethered and Tetherless Authentication System and Method An embodiment can be understood with reference to FIG. 16, a schematic diagram showing the interactions among participating parties of a mobile device enabled desktop tethered and tetherless authentication application or system. In an embodiment, a cloud universal identification server 1602 is communicably connected to a computing device 1606 and a mobile device 1604. As well, computing device 1606 is communicably connected to mobile device 1604. The connection can be over the Internet, Intranet, USB, wifi, Bluetooth, and any other communications protocol. In an embodiment, cloud universal identification server 1602, computing device 1606, and mobile device 1604 communicate using APIs.

In an embodiment, the entity 1610 trying to log into computing device 1606 does not have to be the same entity 1608 to which computing device 1606 belongs or is otherwise authorized to use or own computing device 1606. For example, entity 1610 can be a child trying to log into his parent's 1608 computing device 1606 and, yet, in accordance with the innovation, it is the parent 1608 who authorizes the logging in process.

In an embodiment, entity 1608 has previously registered with and has had stored data reflective of a plurality of identity attributes as discussed within this application. For example, entity 1608 could be the parent of the example above who already has housing loan information, color preferences, social media friends, birthdate, biometric data such as fingerprints, etc., previously stored in a secure storage (not shown) communicably connected to cloud universal identification server 1602.

In an embodiment, cloud universal identification server 1602 is system 400 described in detail above and/or any of its subparts such as for example LDAP 412 or database 414.

In an embodiment, cloud universal identification server 1602 continually updates information about entity 1608 as entity 1608 continues to directly or indirectly provide identity information, such as new or updated medical records, new job applications, and the like. Such digital information can be available to cloud universal identification server 1602 via APIs.

In an embodiment, cloud universal identification server 1602 receives registration information that associates a mobile device with the plurality of identifying attributes associated with the user. For example, entity 1608 can register their mobile device 1604 with cloud universal identification server 1602. In another embodiment, entity 1608 can register their mobile device 1604 with code previously installed on computing device 1606. In an embodiment, entity 1608 registers a plurality of mobile devices 1608 with either or both of cloud universal identification server 1602 and computing device 1606.

In an embodiment, entity 1608 can register a plurality of computing devices 1606 with cloud universal identification server 1602.

Thus, authentication can occur on any registered computing device via any registered mobile device of entity 1608.

In an embodiment, cloud universal identification server 1602 receives, during a login process by entity 1610 to computing device 1606, a request to authenticate the login process at computing device 1606.

In an embodiment, the request is received from mobile device 1604. In the embodiment, computing device 1606 had previously installed code, which initially presents to a user a login option to log in via mobile device. Computing device 1606 is configured to send a type of login request or notification of a login to mobile device 1604, upon receiving user input that mobile device login is selected. Computing device 1606 can know which mobile device to send the request or notification to by various means. Computing device 1606 can detect the presence of mobile device 1604 and be configured to send the request or notification to the detected device. Computing device 1606 can be pre-configured to send any request or notification to specifically mobile device 1604. Computing device 1606 can make a call to cloud universal identification server 1602 to ask to which mobile device to send the request or notification. Other configurations for identifying which mobile device to notify of the login process are contemplated within this discussion.

In an embodiment, mobile device 1604 is tethered to computing device 1606 and computing device 1606 is not connected to the Internet. In this embodiment, computing device 1606 sends the request or notification to mobile device 1604 which has wifi, Bluetooth or other capabilities to communicate over a network with cloud universal identification server 1602 to complete the login process as discussed herein.

In an embodiment, the request is received from code previously installed on computing device 1606.

In an embodiment, cloud universal identification server 1602 confirms, via a parameter in the request, the identity of computing device 1606. For example, cloud universal identification server 1602 can compare and match the identity of computing device 1606 received in the request for authentication with one of previously registered computing devices.

In an embodiment, in response to identifying computing device 1606, mobile device 1604, and their relationship, cloud universal identification server 1602 transmits to mobile device 1604 authentication factors associated with the entity 1608. In an embodiment, the authentication factors were previously stored in the storage of the cloud universal identification server 1602. An example identity authentication system is described in co-assigned patent application titled, "METHOD AND APPARATUS FOR AN IDENTITY ASSURANCE SCORE WITH TIES TO AN ID-LESS AND PASSWORD-LESS AUTHENTICATION SYSTEM," which is incorporated herein by reference in its entirety. For example, entity 1608 is asked to provide their favorite color, the model of their current car, and a fingerprint to the touchscreen of mobile device 1604.

In an embodiment, cloud universal identification server 1602 receives data which reflects answers to or satisfaction of the authentication factors from mobile device 1604. Subsequently, cloud universal identification server 1602 confirms such received data by comparing and matching such data with data previously stored on the storage of cloud universal identification server 1602. In another embodiment, cloud universal identification server 1602 confirms such received data by comparing and matching such data with data on the Internet in real-time.

After confirming the authentication of entity 1604, cloud universal identification server 1602 transmits to computing device 1606, informational data causing the login process to be successful. For example, the informational data can be presented on a screen on computing device 1606 to entity 1610, indicated a login and password that entity 1610 needs to type in to log into computing device 1606. In another embodiment, cloud universal identification server 1602 transmits the login information computing device 1606 and computing devices 1606 applies that information to complete the login process, without intervention of entity 1610.

An Exemplary Embodiment of Mobile Device Enabled Desktop Tethered and Tetherless Authentication In an embodiment, a computer-implemented method (or in alternative embodiments, a system or non-transitory computer-readable medium) is provided, the method comprising: receiving and storing, at a cloud universal identification server having a digital storage, a plurality of identifying attributes associated with a user; receiving and storing, at the cloud universal identification server, registration information that associates a mobile device with the plurality of identifying attributes associated with the user; during a login process to a computing device associated with the user, receiving a request to authenticate the login process at the computing device, the request received from either the mobile device or from code previously installed on the computing device; confirming, at the cloud universal identification server, the identity of computing device of the request for authentication by positively matching the identity of the computing device with one of previously registered computing devices, registered at the cloud universal identification server; transmitting, by the cloud universal identification server, at least three authentication factors associated with the user, the at least three authentication factors for delivery to the mobile device, and the at least three authentication factors obtained or derived from authentication factors associated with the user previously stored in the storage of the cloud universal identification server; and upon receiving, at the cloud universal identification server and from the mobile device, data that satisfies the at least three authentication factors, transmitting for delivery to the computing device, authentication data causing the login process to be successful; wherein one or more steps are performed on at least a processor coupled to at least a memory. The exemplary method can further comprise wherein the computing device is communicably connected to the cloud universal identification server via the previously installed code and wherein such code recognizes the mobile device via a previous registration of the mobile device to the code. The exemplary method can further comprise wherein the entity initiating the login process is not the user. The exemplary method can further comprise wherein the computing device is any of: a desktop or laptop computer. The exemplary method can further comprise wherein an attribute of the plurality of identifying attributes is any of: an email address, a social login, an ID from the digital storage, a numeric ID, a computer login, or Active Directory ID. The exemplary method can further comprise wherein an app was previously downloaded on mobile device for purposes of associating the mobile device with the cloud universal identification server and with the computing device. The exemplary method can further comprise wherein the computing device is configured to send a notification to the mobile device causing the mobile device to request authentication at the cloud universal identification server. The exemplary method can further comprise wherein a plurality of computing devices associated with the user are registered at the cloud universal identification server. The exemplary method can further comprise wherein a plurality of mobile devices associated with the user are registered at the cloud universal identification server.

An Exemplary Credential Provider

In an embodiment, biometric authentication may be offered on any network attached Windows PC (the user is not assumed to be an Enterprise user or part of a corporate network, but is a personal user on a home computer, e.g. "grandma" and "kids").

Herein, the innovation is collectively referred to as "the system."

How

In an embodiment, biometric authentication calls are incorporated into the credential provider ("CP") product. When attached to a network, the CP will make calls to a provided biometric partner to validate the user's identity from the CP and allow access.

In an embodiment, the following hold:
  In order for biometric authentication to work from a given personal computer ("PC"), the PC is able to make a network call to the system's biometric cloud service. The system tethers the PC to the internet by using a Bluetooth, wifi, or USB connection to the user's phone.
  The CP is configurable with needed information to make an oauth call to the correct bio authentication service in the cloud.
    In a corporate identity management system (e.g., Avatier's Identity Management System) AIMS install, each AIMS cluster is configured with the needed oath info, but
    In a Windows app, each installation must have the needed credentials.

Either all users of the CP app authenticate using a common set of oath credentials, or the system segments the users in such a way that they talk to a range of different authentication services A user may bio authenticate into local accounts on the PC A user may bio authenticate into a local account on a PC if they have previously provided bio enrollment for the given account at that PC "Enrollment" consists of a one-time operation where the user enters non-bio credentials to log in (e.g. userid and password) and then clicks on a link to perform bio enrollment. The bio enrollment validates that the user can pass a bio challenge, and if so, enroll their information.

Installation Use Cases

Downloading App from System's Site

The user can download a CP installer from a system web site. The file would be an MSI and would require the user to install with administrative authority (using UAC)

Downloading App from MS App Store

The user can download a CP installer from the MS App store. The app would have to pass any Microsoft-imposed limitations/restrictions in order to be added to the store. Updates to the app would require recertification from MS.

Installation Authority

The user must have administrator authority to install the CP. The CP code will be called from the windows LoginUl, which runs as Administrator, so anything it calls must be installed as Administrator (otherwise any user on the system could install anything they wanted (e.g. keyboard logger, hard disk formatter, etc.) and it might end up being run as Administrator anytime anyone attempts to log in to the box.

OAuth Configuration Use Cases

Initial Downloading of OAuth URL and Credentials

During installation of the CP, the installer will retrieve the current OAuth credentials from the system's Bio Credential cloud service. The CP will only function after credentials have been downloaded, validated, and installed. The credentials will consist of a digitally signed credential file and a*.cer file containing the public certificate that the CP can use to validate the signature of the credential file.

Updating to Current OAuth URL and Credentials

The first time the CP is launched on a given day (i.e., at most, once per day) the CP will query the system's Bio Credential cloud service to check for any updates to the credentials. If updates are available, the CP will download the latest credentials and associated*.cer file, validate the signature, and install them. All future bio authentication calls will use the updated OAuth credentials.

OAuth URL

In order to perform a bio challenge against a user, AIMS currently sends http requests to the base URL of the bio web service:

https://gmi-ha.iwsinc.com

Based on the type of call AIMS is making to the web service, AIMS adds additional components to the URL:

Generate an authentication token: Appends /usermanager/oauth/token?scope=SCOPE_TENANT_ADMIN&grant_type=client_crede ntials Submit a bio challenge to the server /tenant/{tenantName}/app/{appCode}/template/{templateName}/person/{*biold* }/message In the text above, the bold items come from the downloaded OAuth credential file. The *bold/italicized* item is user specific and is specified by the user during a login attempt with the CP.

Partitioning of OAuth Credentials

It may be desirable/required for some CP users to send bio requests with one set of OAuth credentials, while other users send with another. However, if the target audience for the product is individuals, then all individuals would most likely send with the same credentials. For load balancing purposes, CP might not send requests with a comment set of credentials. There is contemplated other reasons to do so (e.g. offering different QoS for a fee).

Security Use Cases

Protecting OAuth Credentials From Tampering

It the OAuth credentials were to be tampered with, then the CP could end up contacting a malicious server to service bio requests, which could lead to revealing user's bio information to a hacker (MITM attack) and could lead to allowing malicious users access to a PC (by using a fake server to return fake positive results). The OAuth credentials need to be protected from being tampering (must be encrypted and/or signed).

Using private/public key signing, the OAuth credential providing service should digitally sign each credential file and provide an associated public key Protecting OAuth Calls From DNS or/etc/hosts Attack As the end user's machine contacts the bio server, it needs to be provable that it is communicating with the correct server, otherwise a MITM could collect information and/or provide invalid responses to bio challenges. The code sends requests to the host gmi-ha.iwsinc.com, but if the client were to resolve the host to the IP address of a malicious server, then the server could log user's bio information and/or return false positive results.

May indicate a high level of security:

In one use case a requestor's server talks to the system's authentication server using OAuth 2 credentials through an SSL/TLS framework. Using OAuth2 is a standard mechanism for securing communications and should make hijacking that communications channel more difficult.

On the mobile client-side communication is initiated through APN or GMC networks, which is secured with KPI and then the messages themselves are pulled from our authentication server, which is protected using OAuth 2 credentials through an SSL/TLS framework.

Responses are polled from our servers (using the same security mechanism mentioned above) or sent through postback to designated servers (when using the polling method.) Additionally, each authentication request generates a transactionlD and a responselD, so that can independently verify transaction requests and responses from the server.

Identifying Source of Bio Challenge to End User

Assuming two bio challenges are issued at about the same time (perhaps from two PCs, or may be from a PC and from a web page or a credit card transaction), as the user is presented with the challenges on their device, can the user distinguish which challenge came from which service? What if 2 challenges came at roughly the same time, one from a fraudulent device and one from the real device? If the user could not distinguish between the two, they may approve the first (i.e. the fraudulent one).

Similarly, if an attacker could time things correctly or if they could insert a MITM or even a simple proxy in the network, they could detect that a bio challenge was sent for the user and then immediately send a similar fraudulent challenge just ahead of the true one. This could cause the fraudulent challenge to arrive at the user's device first. The user would be expecting the challenge to arrive and would answer it without suspecting it is fraudulent. The attacker could then use the response to "legitimately" gain access to a resource that they truly don't have the rights to. To solve this issue, the challenge must state from what machine it came; it would be even better if the challenging client displayed a random code and as the challenge arrives, it also contains the same random code to validate which client it came from.

Enrollment Use Cases

Initial Enrollment

After installing the CP, the user first enrolls their biometrics against a local account and then they will be allowed to log into the enrolled local account with biometrics alone. The CP login tile will include field allowing the user to specify who they are and a login button.

1. From windows login screen, the user selects the system's CP tile (assuming windows 8+, which is a User First model)
2. There are no enrolled users, so the CP does not display an "Unenroll" link (see use cases below) or if it does display the link, it will be disabled.
3. The user enters their local account name and presses the login button
4. The account is not enrolled, so the CP prompts the user to enter their bio identity (email address with which the bio app is configured on their device)
5. The CP sends a challenge to the user's device
6. The user successfully answers the challenge
7. The user has not shown that they have any rights to log in to the local account, so the CP prompts the user for the current password
8. The CP prompts for an optional display name of this authentication, such as "left thumb" or "facial"
9. The CP calls Windows LSA (Local Security Authority) service to validate the password
10. The password validates, so the CP has verified that the user has rightful access to the local account and that the user can be bio authenticated with the provided bio identity email address
11. The CP creates the user's BioEnrollment Data as a tuple consisting of (LocalMachineName, LocalAccountName, BioIdentity, DisplayName).
12. The CP stores the BioEnrollment Data in a secure manner. The BioEnrollment datastore is security sensitive data; an attacker could modify the data and gain access to any local account on the box. It is preferable that the data be locally stored for the following reasons:
   a. It only has meaning on the local box
   b. If it were stored publically, then one must concern oneself with how to secure it during transport and while at rest Unenrollment In order to unenroll (remove BioEnrollment Data), the user must pass a bio challenge first. The requirement to pass a bio challenge stops a malicious person from removing the BioEnrollment data without the true user's consent. The unenrollment works as follows:

1. From windows login screen, the user selects the system's CP tile (assuming windows 8+, which is a User First model)
2. If there is at least one enrolled user, then the CP will display an "Unenroll" link, but the link will be disabled while waiting for user input.
Alternative: So as not to reveal the existence of a given account name, the link can always be enabled.
3. The user enters their local account name. As the user types the account name, the CP reads the account name one character at a time. If at any moment the local account name matches an enrolled user, then the tile will enable an "Unenroll" link.
Alternative: So as not to reveal the existence of a given account name, the link can always be enabled
4. The user clicks on the Unenroll link
5. The CP prompts the user with a "This will disable bio authentications for user XYZ. Are you sure?"
6. The user chooses Yes
7. The CP sends a challenge to the user's device
8. The user successfully answers the challenge
9. The CP looks up the given local username in its BioEnrollment Data store and finds all matching BioEnrollment Data values. The CP lists the matching values by their DisplayName values and allows the user to select one or more
10. The user selects one or more authentications
11. The CP removes the user's BioEnrollment Data from local storage 1.5.3 Reenrollment It shall be possible for a user to reenroll. Reenrollment might be required or desired for reasons such as:
  The user has injured their original finger/thumb and can't use it.
  The user would like to add additional forms of bio authentication (e.g. multiple fingerprints)
  Multiple users might want to be able to access the same shared account Reenrollment Works as Follows:

1. From windows login screen, the user selects the system's CP tile (assuming windows 8+, which is a User First model)
2. If there is at least one enrolled user, then the CP will display a "Reenroll" link, but the link will be disabled while waiting for user input.
Alternative: So as not to reveal the existence of a given account name, the link can always be enabled.
3. The user enters their local account name. As the user types the account name, the CP reads the account name one character at a time. If at any moment the local account name matches an enrolled user, then the tile will enable a "Reenroll" link.
Alternative: So as not to reveal the existence of a given account name, the link can always be enabled
4. The user clicks on the Reenroll link
5. The CP prompts the user with a prompt something like "Replace all previous enrollments or add a new one to them? Replace Add"
6. The user selects either Replace or Add
7. The CP sends a challenge to the user's device
8. The user successfully answers the challenge
9. The user has not shown that they have any rights to log in to the local account, so the CP prompts the user for the current password
10. The CP calls Windows LSA (Local Security Authority) service to validate the password
11. The password validates, so the CP has verified that the user has rightful access to the local account and that the user can be bio authenticated with the provided bio identity email address
12. The CP creates the user's BioEnrollment Data as a tuple consisting of (LocalMachineName, LocalAccountName, BioIdentity).
13. If the user chose to Replace enrollment data, then the CP deletes all prior BioEnrollment Data
14. The CP stores the BioEnrollment Data in a secure manner Authentication Type Rename It shall be possible for a user to rename a previously saved authentication. The user may have mistyped the name previously or might have provided a vague name (such as "thumb") and would like to refine it to a more specific value (such as "left thumb").

Authentication Use Cases

BioAuthentication with Single Enrollment

A user may authenticate into their PC by providing their local userid and passing a biometric challenge. The user must first be enrolled at the local machine once prior to doing a bioauthentication. Bioauthentication works as follows:

1. From windows login screen, the user selects the system's CP tile (assuming windows 8+, which is a User First model)
2. The user enters their local account name.
3. The user presses the standard windows login icon (the blue arrow in windows 8 and 10)
4. The CP looks up the given local username in its BioEnrollment Data store and finds the user's BioEnrollment Data, which includes the user's BioIdentity email
5. The CP sends a challenge to the user's device
6. The user successfully answers the challenge
7. The CP returns a true to the windows LoginUI indicating that the user has passed authentication BioAuthentication with Multiple Enrollments A user may enroll multiple times (with different fingers, facial, voice, etc) and may wish to choose into their PC by providing their local userid and passing a biometric challenge. The user must first be enrolled at the local machine once prior to doing a bioauthentication. Bioauthentication works as follows:

1. From windows login screen, the user selects the system's CP tile (assuming windows 8+, which is a User First model)
2. The user enters their local account name.
3. The user presses the standard windows login icon (the blue arrow in windows 8 and 10)
4. The CP looks up the given local username in its BioEnrollment Data store and finds multiple matching BioEnrollment Data values
5. The CP lists each BioEnrollment Data value by name and allows the user to choose which one they want to authenticate with
6. The user selects a named BioEnrollment Data value
7. The CP sends a challenge to the user's device
8. The user successfully answers the challenge
9. The CP returns a true to the windows LoginUI indicating that the user has passed authentication User Stories Following are user scenarios, according to an embodiment:

As an iOS user, I want to download an app to my personal mobile device enabling me to pass biometric tests on it to log in to my personal PC as a local user As an iOS user, I want to download an app to my personal mobile device enabling me to pass biometric tests on it to log in to my corporate PC as a domain user As a user of a personal PC, I want to log in to my local account on my PC by authenticating with the fingerprint reader on my mobile device As a corporate user of a corporate PC, I want to log into my AD account on my corporate PC by authenticating with the fingerprint reader of my personal mobile device As an enterprise admin, I want to require my users to use multiple authentication factors when logging into their PC, such as possession of a device and bio metrics.

Figure 17:
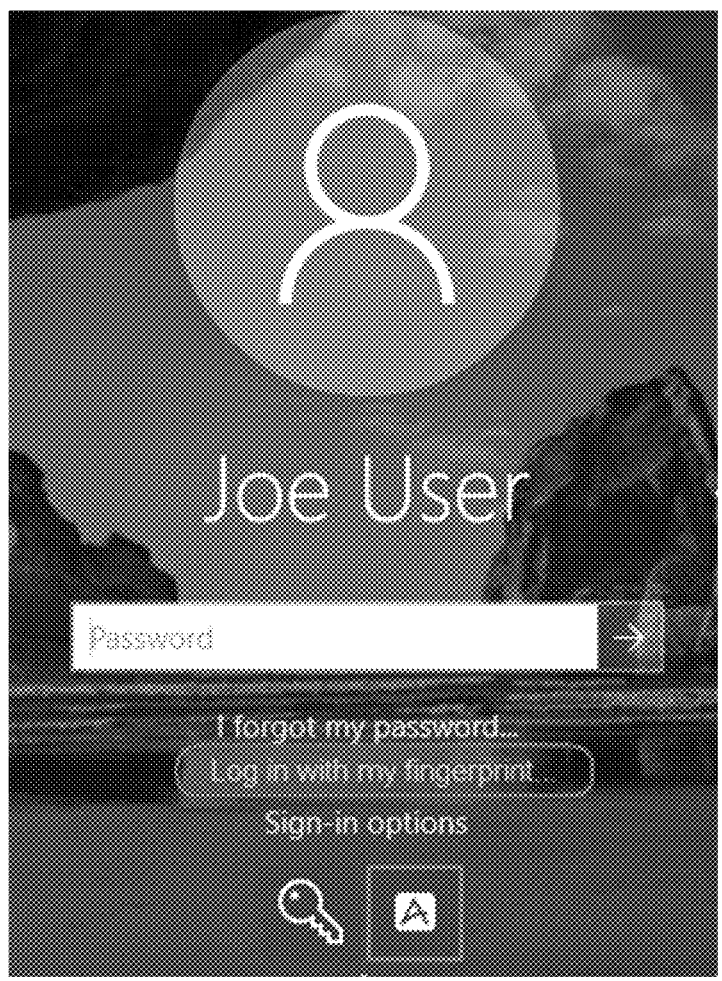
FIG. 17 is a screen show of a login screen linking to a credential provider, according to an embodiment.

FIG. 17 depicts a screen show of a login screen, a link to the CP, according to an embodiment.

Figure 18:
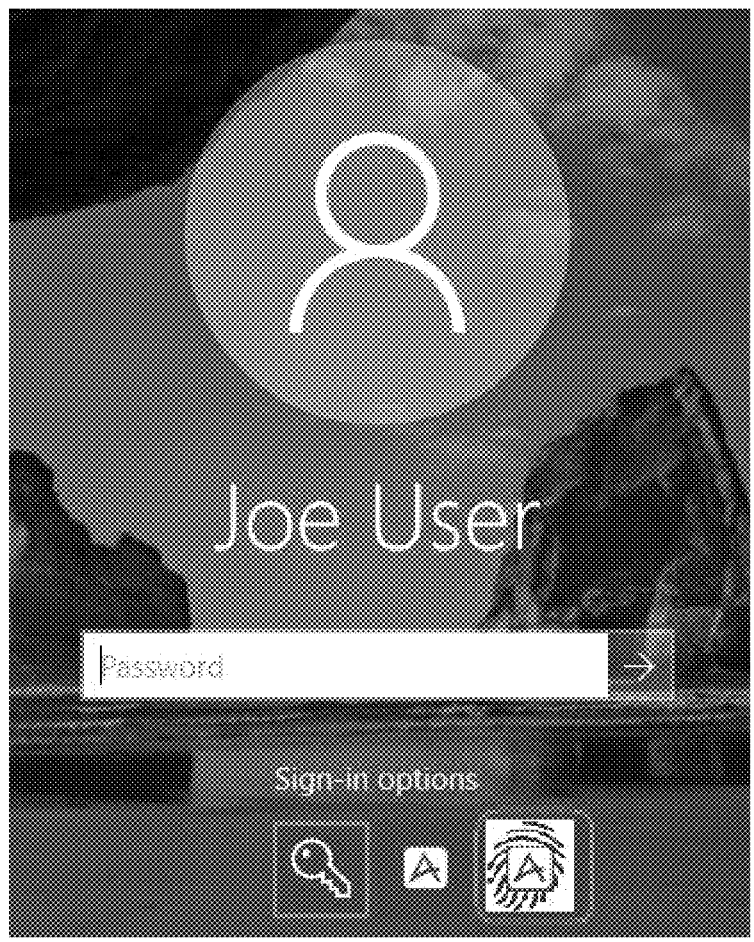
FIG. 18 is a screen show of a login screen linking to a credential provider, according to an embodiment.

FIG. 18 depicts another screen shot showing a CP that does only fingerprint, according to an embodiment.

As a corporate user of a corporate PC, I want to log into my AD account by authenticating into Password Station The user would click on something in the CP that would launch the AIMS secure browser, challenge the user to authenticate (using questions, bio, . . . anything in the authentication framework).

Upon success, the user exits the AIMS browser and is allowed access into their PC without a password Authenticating Without a Password The function of a typical CP is to capture credentials (typically userid and password) and serialize them into a known buffer format so that they can be submitted to the LSA (Local Security Administrator).

In the case of a smartcard login, the smartcard appears to contain the needed credentials. The smartcard CP would then get the (encrypted) credentials off of the smart card and provide them, along with a user-entered PIN to the LSA.

There appear to be other ways to authenticate the user (e.g., without a password).

http://stackoverflow.com/questions/41869313/how-to-write-a-ksp-to-hook-up-into-kerb-certificate-logon RSA provides a CP for logging in to a PC without a password. An embodiment involves an RSA server.

LSA supports custom Authentication Packages. An Authentication Package is a DLL that analyzes the credentials collected from the CP (e.g. userid/password, smartcard/pin, etc)

Determines if a security principal is allowed to log on

Establishes a new logon session and creates a logon identifier

Passes security info to the LSA for the principal's security token

Vendors can create a custom Security Support Provider (SSP) using the MS SSP Interface. For example, Microsoft ships a sample SampSSP with the Platform Software Development Kit (SDK) (in win 7 SDK at C:\Program Files\Microsoft SDKs\Windows\v7.1\Samples\security\authentication\sampssp).

A Security Package is deployed as a DLL of one of the following types:

SSP/AP (Security Support Provider/Authentication Package)

SSP

Example #1: RFID CP A

The following describes an example (includes code) of a CP that allows one to log in with just an RFID card, however one must store your userid/password on one's machine ahead of time. Then, when one does a ctrl-alt-del, one sees an RFID CP tile. If one holds one's RFID card near the reader, it confirms one's identity, decrypts one's stored credentials, and submits them to LSA for normal authentication.

See https://www.codeandsec.com/Windows-RFID-Login-Credential-Provider

In an embodiment,

Create a .net CLI to encrypt/write or read/decrypt a user's password using MS DPAPI.

The password storage CLI would always run from the logonUI.exe's context, so anything it encrypts would only be readable by the same account Using the RFID CP as an example, expect the user to enter their userid and click on bioAuthenticate button The CP would look up the user's biold from the cloud, verify licensing, and if all passes, submit a bio challenge to imageWare on behalf of the user Assuming the user passes the challenge, the CP would then read the encrypted user credentials from local storage and build a set of credentials (with userid+ password) and submit to LSA for authentication Limitations of this Approach:

If a user changes their password, bio authentication ceases to work.

The system is responsible for storing the password somewhere, as discussed in detail herein.

Local storage for local accounts might not be too risky because only one machine is at risk and the embodiment can use MS DPAPI to encrypt data.

Domain account is risky because the password needs to be transmitted and stored in the cloud, putting the data it much larger risk during transport and storage.

Example #2: RFID CP B

A similar RFID example exists, but with a lot more code in it. It appears to work the same as the first example, in that one must store the userid and password and then use the RFID authentication to indicate that one may decrypt the credentials and submit to LSA for authentication.

https://github.com/tylermenezes/Rfid-Credential-Provider and https://medium.comi@tylermenezes/rfid-credential-provider-d0bf8ef29b16

Example #3: MySmartLogon

MySmartLogon has a youtube showing how an rfid can be treated similarly to a smartcard to authenticate without a password. It appears to generate PKI certificates for the user during enrollment/provisioning and then the user can log on with the certificate later without a password. It appears that the certificate is stored either in the RFID (not likely) or the RFID's value is used as a key to look up the certificate from somewhere else.

Windows 10 Hello

Windows 10 Hello provides new Authentication and user identity support. (C #SDK is included for windows 10 and Universal Windows Platform (UWP) apps).

Biometric logins

Windows Unlock with Hello Companion Devices (using a phone or a USB attached device as part of login). Example: Carry a phone in their pocket that is already paired with PC over Bluetooth. Upon hitting the spacebar on their PC, their phone receives a notification. Approve it and the PC simply unlocks Logging in without a password Credential locker for locally storing and retrieving credentials safely Fingerprint bio authentication at application level Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method, comprising:
receiving and storing, at a cloud universal identification server having a digital storage, a plurality of identifying attributes associated with a user and one or more identifying attributes associated with a computing device;
receiving, at the cloud universal identification server, a request to authenticate a process at the computing device,
the request being received from credential provider code that was previously installed on the computing device,
wherein the credential provider code was previously configured to recognize a mobile device, and
wherein the request indicates that the mobile device was selected for authentication purposes;
in response to the request indicating that the mobile device was selected for authentication purposes, retrieving, from a database, a protocol for communicating with the mobile device;
transmitting, by the cloud universal identification server and in accordance with the retrieved protocol, first authentication data associated with the user for delivery to the mobile device; and
upon receiving, at the cloud universal identification server and from the mobile device, second authentication data, transmitting for delivery to the credential provider code of the computing device, the second authentication data causing the authentication to the process to be successful;
wherein one or more steps are performed on at least a processor coupled to at least a memory.

2. The method of claim 1, wherein the computing device is communicably connected to the cloud universal identification server via the previously installed credential provider code and wherein such credential provider code recognizes the mobile device via a previous registration of the mobile device to the credential provider code.

3. The method of claim 1, wherein an entity initiating the authentication process is not the user.

4. The method of claim 1, wherein the computing device is any of: a desktop or laptop computer.

5. The method of claim 1, wherein an attribute of the plurality of identifying attributes is any of: an email address, a social login, an ID from the digital storage, a numeric ID, a computer login, or Active Directory ID.

6. The method of claim 1, wherein an app was previously downloaded on the mobile device for purposes of associating the mobile device with the cloud universal identification server and with the credential provider code of the computing device.

7. The method of claim 1, wherein the computing device is configured to send a notification to the mobile device causing the mobile device to request authentication at the cloud universal identification server.

8. The method of claim 1, wherein a plurality of computing devices associated with the user are registered at the cloud universal identification server.

9. The method of claim 1, wherein a plurality of mobile devices associated with the user are registered at the cloud universal identification server.

10. An apparatus, comprising:
a first receiving and storing processor configured to receive and store, at a cloud universal identification server having a digital storage, a plurality of identifying attributes associated with a user and one or more identifying attributes associated with a computing device;

wherein the receiving and storing processor is further configured to receive, at the cloud universal identification server, a request to authenticate a process at the computing device, the request being received from credential provider code that was previously installed on the computing device, wherein the credential provider code was previously configured to recognize a mobile device, and wherein the request indicates that the mobile device was selected for authentication purposes;

a retrieving processor configured to retrieve, from a database, a protocol for communicating with the mobile device, in response to the request indicating that the mobile device was selected for authentication purposes;

a transmitting processor configured to transmit, by the cloud universal identification server and in accordance with the retrieved protocol, first authentication data associated with the user for delivery to the mobile device; and wherein the transmitting processor is further configured to transmit, upon receiving, at the cloud universal identification server and originating from the mobile device, second authentication data for delivery to the credential provider code of the computing device, the second authentication data causing the authentication to the process to be successful; and at least one memory operable to store computer program instructions executable by at least one of said processors.

11. The apparatus of claim 10, wherein the computing device is communicably connected to the cloud universal identification server via the previously installed credential provider code and wherein such credential provider code recognizes the mobile device via a previous registration of the mobile device to the credential provider code.

12. The apparatus of claim 10, wherein an entity initiating the authentication to the process is not the user.

13. The apparatus of claim 10, wherein the computing device is any of: a desktop or laptop computer.

14. The apparatus of claim 10, wherein an attribute of the plurality of identifying attributes is any of: an email address, a social login, an ID from the digital storage, a numeric ID, a computer login, or Active Directory ID.

15. The apparatus of claim 10, wherein an app was previously downloaded on the mobile device for purposes of associating the mobile device with the cloud universal identification server and with the credential provider code of the computing device.

16. The apparatus of claim 10, wherein the computing device is configured to send a notification to the mobile device causing the mobile device to request authentication at the cloud universal identification server.

17. The apparatus of claim 10, wherein a plurality of computing devices associated with the user are registered at the cloud universal identification server.

18. The apparatus of claim 10, wherein a plurality of mobile devices associated with the user are registered at the cloud universal identification server.

19. A non-transitory computer readable medium having stored thereon a computer program, said computer program comprising a program code which, when executed by a processor, performs the steps of:

receiving and storing, at a cloud universal identification server having a digital storage, a plurality of identifying attributes associated with a user and one or more identifying attributes associated with a computing device;

receiving, at the cloud universal identification server, a request to authenticate a process at the computing device, the request being received from credential provider code that was previously installed on the computing device, wherein the credential provider code was previously configured to recognize a mobile device, and wherein the request indicates that the mobile device was selected for authentication purposes;

in response to the request indicating that the mobile device was selected for authentication purposes, retrieving, from a database, a protocol for communicating with the mobile device;

transmitting, by the cloud universal identification server and in accordance with the retrieved protocol, first authentication data associated with the user for delivery to the mobile device; and upon receiving, at the cloud universal identification server and from the mobile device, second authentication data, transmitting for delivery to the credential provider code of the computing device, the second authentication data causing the authentication to the process to be successful.

* * * * *